(12) United States Patent
Hoshino et al.

(10) Patent No.: US 7,986,418 B2
(45) Date of Patent: Jul. 26, 2011

(54) DRIVER APPARATUS, PROCESS CONTROL METHOD, PROCESS CONTROL PROGRAM

(75) Inventors: Naoki Hoshino, Saitama-ken (JP); Yuko Kimoto, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1088 days.

(21) Appl. No.: 11/753,608

(22) Filed: May 25, 2007

(65) Prior Publication Data
US 2008/0295116 A1    Nov. 27, 2008

(51) Int. Cl.
*G06F 15/00* (2006.01)
*H04M 1/00* (2006.01)

(52) U.S. Cl. .................................... 358/1.13; 455/556.1

(58) Field of Classification Search ................. 358/1.13, 358/1.14, 1.15, 1.12, 1.8, 1.1, 537, 402, 3.28, 358/500, 473; 455/556.1, 556.2, 39; 719/323; 235/472.01, 462.42, 949; 709/223, 241, 709/239, 206
See application file for complete search history.

(56) References Cited

U.S. PATENT DOCUMENTS
2008/0064501 A1* 3/2008 Patel ............................. 463/40

FOREIGN PATENT DOCUMENTS
| JP | 10-320344 | 12/1998 |
| JP | 11-242544 | 9/1999 |
| JP | 2000-222141 | 8/2000 |
| JP | 2003-241925 | 8/2003 |
| JP | 2004-038739 | 2/2004 |

* cited by examiner

*Primary Examiner* — Saeid Ebrahimi Dehkordy
(74) *Attorney, Agent, or Firm* — Turocy & Watson, LLP

(57) ABSTRACT

A technique is provided that contributes to improvement in convenience of a setting screen for carrying out setting for a function executable in an image processing apparatus. A driver apparatus that causes plural functions executable in an image processing apparatus to be executed in accordance with a setting content set in a setting screen corresponding to each function is provided.

20 Claims, 23 Drawing Sheets

DRIVER APPARATUS, PROCESS CONTROL METHOD, PROCESS CONTROL PROGRAM

BACKGROUND OF THE INVENTION

1. Field of the Invention

The present invention relates to a driver apparatus that causes plural functions executable in an image processing apparatus to be executed in accordance with a setting content set in a setting screen corresponding to each function, and particularly to a technique that contributes to improvement in convenience of setting operation.

2. Description of the Related Art

Traditionally, a printer driver, fax driver or the like is used as a driver apparatus for causing each function in an image processing apparatus that can execute plural functions including printer function and fax function.

Also, recently, a (so-called multitasking processing) driver apparatus is known that carries out the setting operation for each of plural functions executable in an image processing apparatus, parallel, and can realize execution of each of the set plural functions by one execution command.

However, generally, in the function setting screen of the traditional driver apparatus, it is difficult to know whether the setting operation for a function can be carried out parallel to the setting operation on the setting screen for another function that is different (whether setting of multitasking can be carried out or not). Also, currently, at the time of the setting operation for a certain function (for example, print function or the like), a setting item for another function (for example data saving function or the like) that can be set parallel to the setting operation for the former function is arranged at a position that cannot be easily visually recognized, on a deeper hierarchical level or the like in a setting screen having a hierarchical structure.

For the reasons as described above, in some cases, even if the image processing apparatus that is caused by the driver apparatus to issue execution command is capable of executing functions by multitasking, the multitasking processing function is not effectively used.

SUMMARY OF THE INVENTION

An object of an aspect of the invention is to provide a technique that contributes to improvement in convenience of a setting screen for carrying out setting for functions executable in an image processing apparatus.

To solve the above problem, a driver apparatus according to an aspect of the invention is a driver apparatus that causes plural functions executable in an image processing apparatus to be executed in accordance with a setting content set in a setting screen corresponding to each function. The apparatus includes: a switch instruction determination unit configured to determine whether, during a period after a setting operation in a setting screen corresponding to a first function is started and until a job of the function is executed, there is a switch instruction that the setting operation should be switched to a setting operation for a second function that is different from the first function; an instruction request unit configured to request a user to give an instruction as to whether a setting content for the first function should be registered or not, when it is determined by the switch instruction determination unit that there is a switch instruction; a setting registration unit configured to register the setting content when the instruction request unit has received an instruction that the setting content for the first function should be registered; a display control unit configured to display a setting screen corresponding to the second function in accordance with the switch instruction determined by the switch instruction determination unit; and a setting execution unit configured to, when it has received an execution command based on setting contents of the first and second functions, execute the first and second functions in accordance with the setting content set in the setting screen corresponding to the second function and the setting content registered by the setting registration unit.

A process control method according to an aspect of the invention is a process control method for causing plural functions executable in an image processing apparatus to be executed in accordance with a setting content set in a setting screen corresponding to each function. The method includes the steps of: determining whether, during a period after a setting operation in a setting screen corresponding to a first function is started and until a job of the function is executed, there is a switch instruction that the setting operation should be switched to a setting operation for a second function that is different from the first function; requesting a user to give an instruction as to whether a setting content for the first function should be registered or not, when it is determined that there is a switch instruction in the step of determining a switch instruction; registering the setting content when an instruction that the setting content for the first function should be registered has been received in the step of requesting an instruction; displaying a setting screen corresponding to the second function in accordance with the switch instruction determined by the step of determining a switch instruction; and when an execution command based on setting contents of the first and second functions has been received, executing the first and second functions in accordance with the setting content set in the setting screen corresponding to the second function and the setting content registered by the step of registering the setting.

A process control program according to an aspect of the invention is a process control program for causing a computer to execute processing to execute plural functions executable in an image processing apparatus in accordance with a setting content set in a setting screen corresponding to each function. The program causes the computer to execute the steps of: determining whether, during a period after a setting operation in a setting screen corresponding to a first function is started and until a job of the function is executed, there is a switch instruction that the setting operation should be switched to a setting operation for a second function that is different from the first function; requesting a user to give an instruction as to whether a setting content for the first function should be registered or not, when it is determined that there is a switch instruction in the step of determining a switch instruction; registering the setting content when an instruction that the setting content for the first function should be registered has been received in the step of requesting an instruction; displaying a setting screen corresponding to the second function in accordance with the switch instruction determined by the step of determining a switch instruction; and when an execution command based on setting contents of the first and second functions has been received, executing the first and second functions in accordance with the setting content set in the setting screen corresponding to the second function and the setting content registered by the step of registering the setting.

DESCRIPTION OF THE EMBODIMENTS

Hereinafter, an embodiment of the invention will be described with reference to the drawings.

Figure 1:
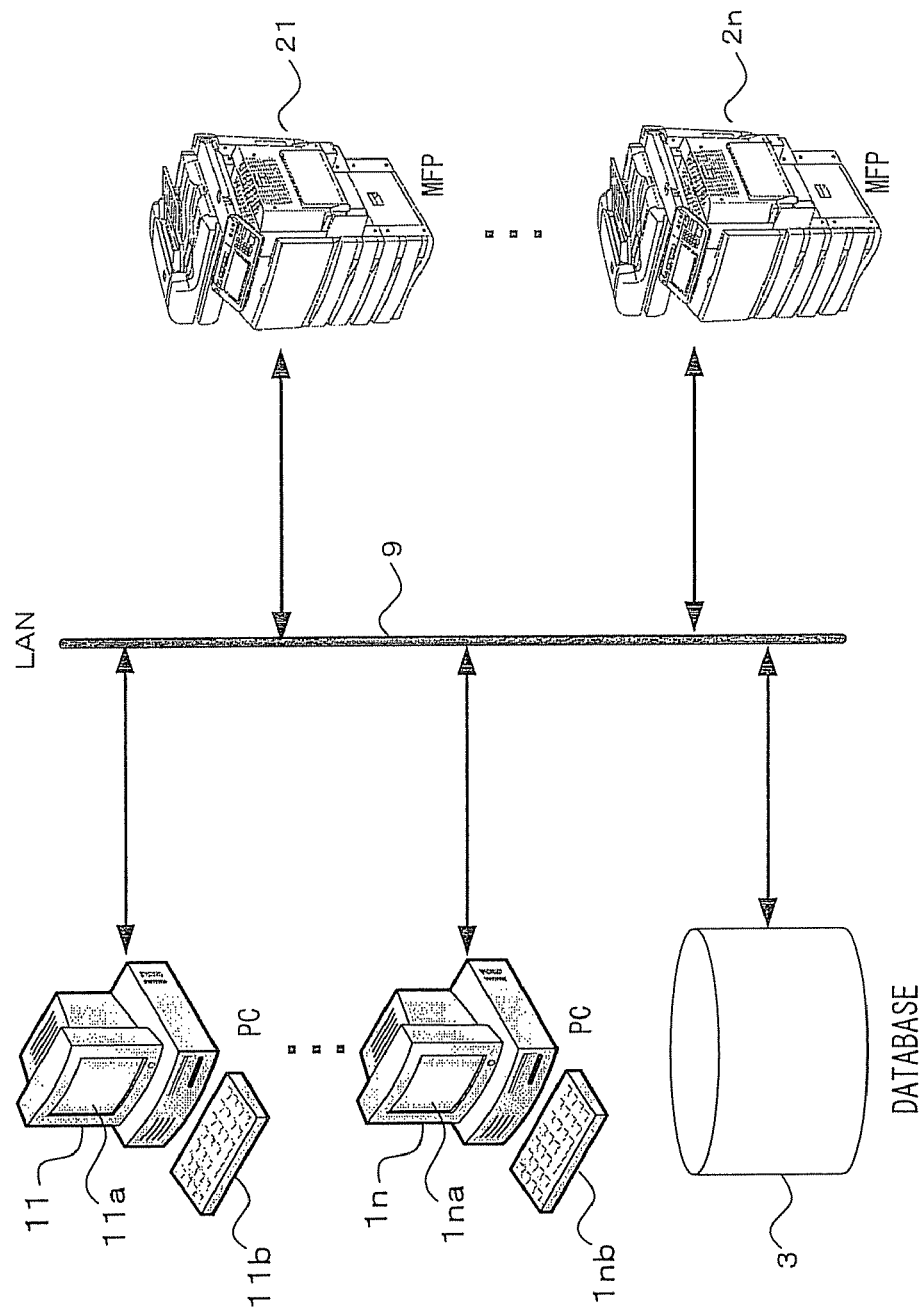
FIG. 1 is a view showing the configuration of an image processing system including a PC 11 according to the embodiment and an image processing apparatus 21.

FIG. 1 is a view showing the configuration of an image processing system including a PC (including a driver apparatus) 11 according to this embodiment and an image processing apparatus 21. In the image processing system shown in FIG. 1, PCs (personal computers) 11-1n, image processing apparatuses 21-2n and a database 3 are connected in a manner that enables mutual communication via a telecommunication line such as a LAN 9.

Here, it is assumed that the means for connecting the PCs 11-1n, the image processing apparatuses 21-2n and the database 3 in a manner that enables mutual communication is a LAN. However, the means is not limited to this and may be the Internet or WAN (irrespective of being wired or wireless)

The PCs 11-1n can make various settings related to image processing functions that are executable in the image processing apparatuses 21-2n, and issue execution commands for various processing functions to the image processing apparatuses 21-2n.

The commands from the PCs 11-1n to the image processing apparatuses 21-2n are carried out by driver apparatuses provided in the PCs 11-1n in accordance with operation inputs made by users who are watching setting screens displayed on displays 11a-1na provided in the PCs 11-1n, using operation input units (for example, keyboard or mouse) 11b-1nb. Here, in this example, the display and the operation input unit are separately provided. However, they are not limited to this and, for example, the functions of the display and the operation input unit may be realized by a touch panel display.

The database 3 has the function of a storage area for storing various kinds of setting information to be used by the PCs 11-1n and the image processing apparatuses 21-2n.

Figure 2:
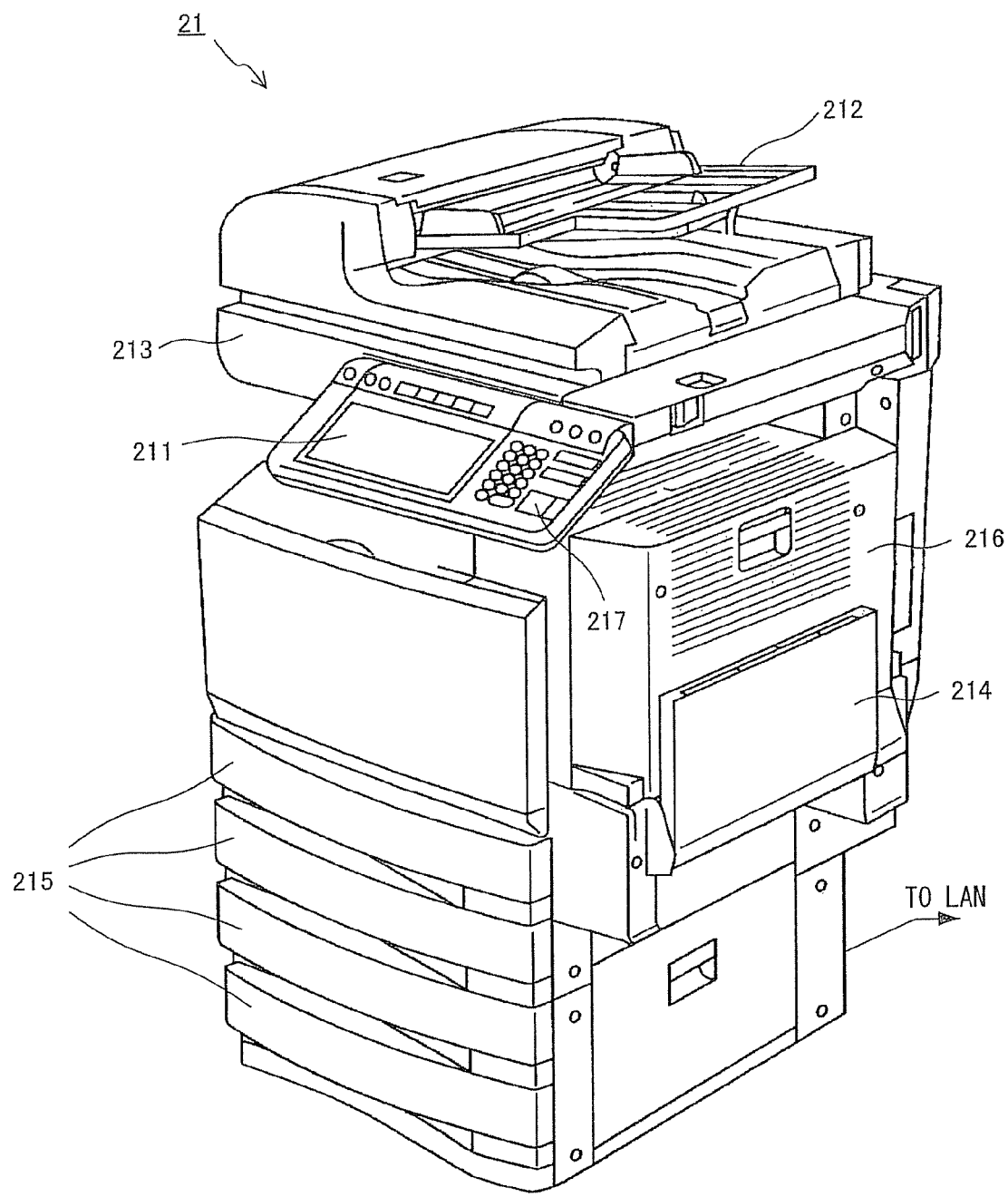
FIG. 2 is a perspective view of appearance for explaining the outline of the image processing apparatus 21 according to the embodiment.

FIG. 2 is a perspective view of appearance for explaining the outline of the image processing apparatus 21 according to this embodiment. Here, an example is described where the image processing apparatus 21 is an MFP (multi-function peripheral).

The image processing apparatus 21 according this embodiment has an interface screen 211, an ADF (automatic document feeder) 212, an image reading unit 213, a manual paper feeder unit 214, a paper feed cassette 215, an image forming unit 216, and an authentication processing unit 217.

Hereinafter, an exemplary operation of the image processing apparatus 21 according to this embodiment will be briefly described. For example, in the case where copy processing (predetermined image processing) is carried out by the image processing apparatus 21, first, the authentication processing unit 217 carries out user authentication processing. Then, in accordance with an operation input to the interface screen 211 by a successfully authenticated user, an original set in the ADF 212 is automatically carried to the position of original reading by the image reading unit 213. The original, thus carried, has its image read by the image reading unit 213. Then, by a paper feed method selected in accordance with an operation input to the interface screen 211, a paper feed operation is carried out by one of the paper feed cassette 215 and the manual paper feeder unit 214. The paper, thus fed, is carried to the image forming unit (image processing unit) 216 and image forming processing based on the image read by the image reading unit 213 is carried out. The copy processing is thus completed.

The interface screen 211 is formed, for example, by a touch panel display, and also has the function of an operation input unit that accepts a user's operation input based on the display contents in the interface screen 211.

The image processing apparatus 21 is capable of executing plural functions that are different from each other, such as a "print function" to carry out print processing based on image data acquired by the image processing apparatus 21, a "fax function" to fax image data (image data acquired by scanning an original, image data received from an external device or the like) acquired by the image processing apparatus 21 to a desired destination, a "scan function" to scan an image of an original, and a "box function" to store image data read from an original by the "scan function" of the image processing apparatus 21 into a desired storage area. In the "box function", at least one of the PCs 11-1n and the image processing apparatus 22-2n connected to the image processing apparatus 21 in a manner that enables communication, can be selected as a data storage destination (destination). As the "scan function" and the "print function" are executed in combination with each other, the copy function can be realized.

As a processing target of the above predetermined processing in the image processing apparatus 21 may be, for example, a sheet original, pamphlet-like original, image data and the like.

Figure 3:
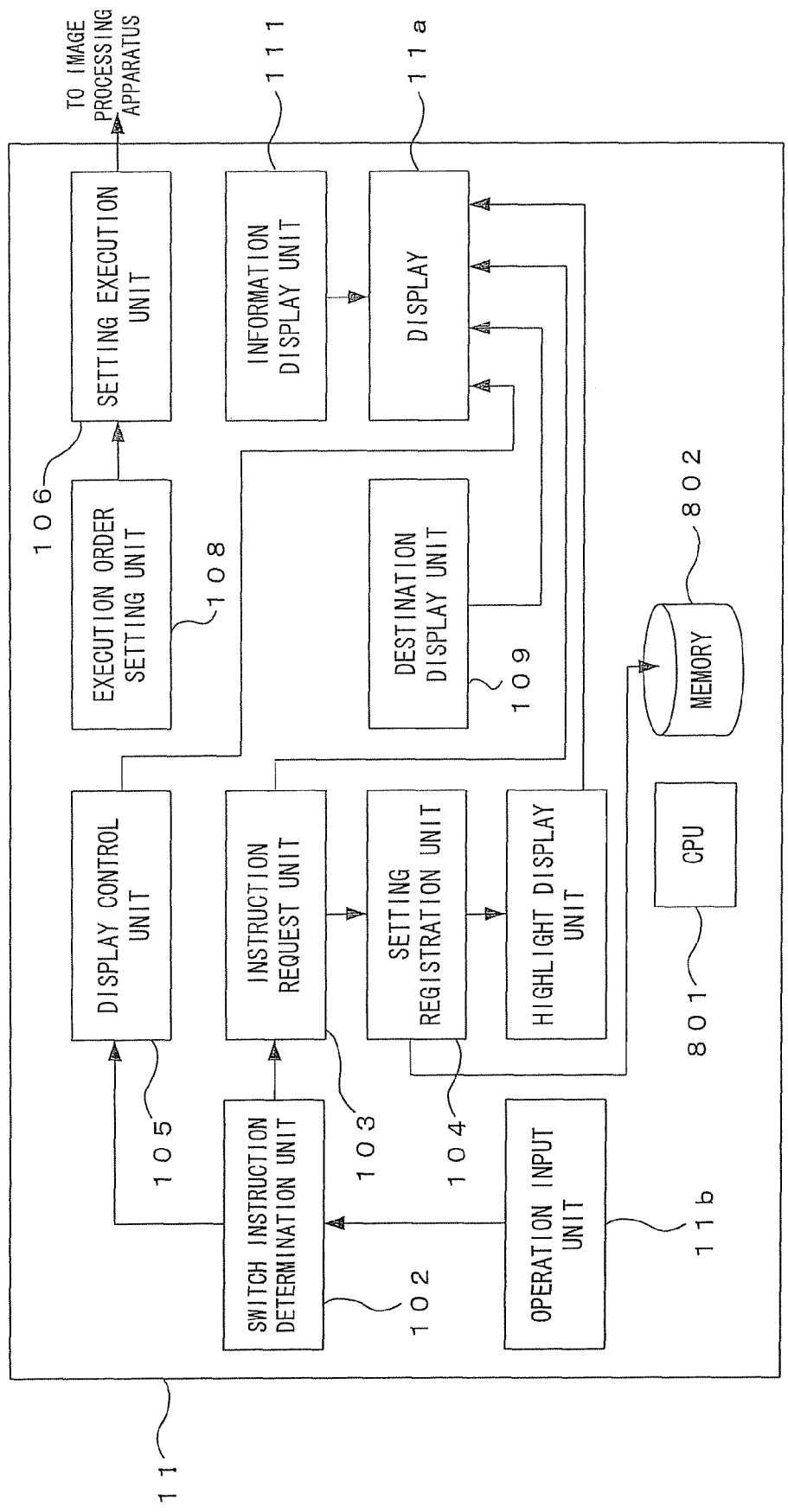
FIG. 3 is a functional block diagram for explaining the PC (driver apparatus) 11 according to the embodiment.

FIG. 3 is a functional block diagram for explaining the PC (driver apparatus) 11 according to this embodiment. In this embodiment, the PCs 11-1n have the same configuration parts and the image processing apparatuses 21-2n have the same configuration parts, too. Since one of the image processing apparatuses 21-2n and one of the PCs 11-1n can realize the image processing system according to this embodiment, hereinafter, the functions of the image processing system formed by the image processing apparatus 21 and the PC 11, as an example, will be described in detail.

The PC 11 according to this embodiment executes plural functions (for example, print function, fax function, scan function, box function and the like) that are executable in the image processing apparatus, in accordance with the setting content set in the setting screen corresponding to each function. Also, the PC 11 according to this embodiment displays plural setting screens (printer driver screen, fax driver screen, scanner driver screen and the like) in a selectable and switchable manner, which are plural setting screens for carrying out setting for each of the plural functions executable in the image processing apparatus 21 and which can display plural setting items of each function in each setting screen.

Specifically, the PC 11 according to this embodiment has an information display unit 101, a switch instruction determination unit 102, an instruction request unit 103, a setting registration unit 104, a display control unit 105, a setting execution unit 106, a highlight display unit 107, an execution order setting unit 108, a destination display unit 109, a display 11a, an operation input unit 11b, a CPU 801, and a memory 802.

The information display unit 101 constantly displays information indicating that setting operations for plural functions can be carried out in parallel (setting by multitasking processing is possible) in each of the setting screens corresponding to the plural functions. Hereinafter, the setting by multitasking processing for plural processing functions is referred to as "multi-setting". Here, the information indicating that the setting operations for plural functions can be carried out in parallel, may be for example, selection items such as button and icon for executing multi-setting. Hereinafter, in this embodiment, the "fax function" is assumed to be an example of "first function" and the "print function" is assumed to be an example of "second function", for convenience in the description.

The switch instruction determination unit 102 determines whether there is a switch instruction that, for example, the setting operation should be switched to the setting operation for the "print function" (second function) during the period after the setting operation by the user in the fax driver screen corresponding to the "fax function" (first function) is started and until a job of the fax function is executed.

It is preferable that the switch instruction determination unit 102 determines selection of an icon or pressing of a button related to the information displayed by the information display unit 101, or selection of a tab or icon for calling the setting screen corresponding to the "print function" (equivalent to a predetermined operation input), or the like, as a switch instruction that the setting operation should be switched to the setting operation for the "print function".

The instruction request unit 103 requests the user, by a screen display or by voice, to give an instruction as to whether the setting content set for the "fax function" should be registered or not, in the case where it is determined by the switch instruction determination unit 102 that there is a switch instruction.

When the instruction request unit 103 has received an instruction that the setting content for the "fax function" should be registered, the setting registration unit 104 registers the setting content, for example, to the memory 802.

The display control unit 105 displays the printer driver screen corresponding to the "print function" in accordance with the instruction that the screen should be switched to the printer driver screen, determined by the switch instruction determination unit 102.

When the setting execution unit 106 has received an execution command for both functions based on the setting contents of the "fax function" and "print function", it causes the image processing apparatus 21 to execute the "fax function" and "print function" in accordance with the setting content set in the setting screen corresponding to the "print function" and the setting content registered to the memory 802 by the setting registration unit.

The highlight display unit 107 highlights a display target such as a button or icon corresponding to a function for which the setting operation has been done (here, it includes a function for which the setting operation has been completed, or a function for which the setting operation has been done to a certain extent but is still being carried out) over a button or icon corresponding to a function for which the setting operation has not been done.

Also, the execution order setting unit 108 has the function of setting the execution order for plural functions in the case of executing the plural functions, for example, in accordance with a user's operation input. The setting execution unit 106 causes each of the plural functions to be executed in the order that is set by the execution order setting unit 108. The information about the execution order set by the execution order setting unit 108 is stored, for example, into the database 3.

The destination display unit 109 displays a destination list for selecting an apparatus to be the destination of predetermined processing from plural apparatuses (for example, PCs 11-1n and the like), on the display 11a as a list of information related to the installation position of each apparatus. Specifically, the destination display unit 109 displays the layout of the information related to the installation position of each apparatus in accordance with the actual installation position of each apparatus.

The CPU 801 is responsible for carrying out various kinds of processing in the driver apparatus, and is also responsible for realizing various functions by executing programs stored in the memory 802. The memory 802 is formed by, for example, a ROM, RAM or the like, and is responsible for storing various kinds of information and programs to be used in the driver apparatus.

Next, the operation of the driver apparatus according to this embodiment will be described. First, the method of calling each driver screen and so on will be described with reference to FIG. 4 to FIG. 10.

Figure 4:
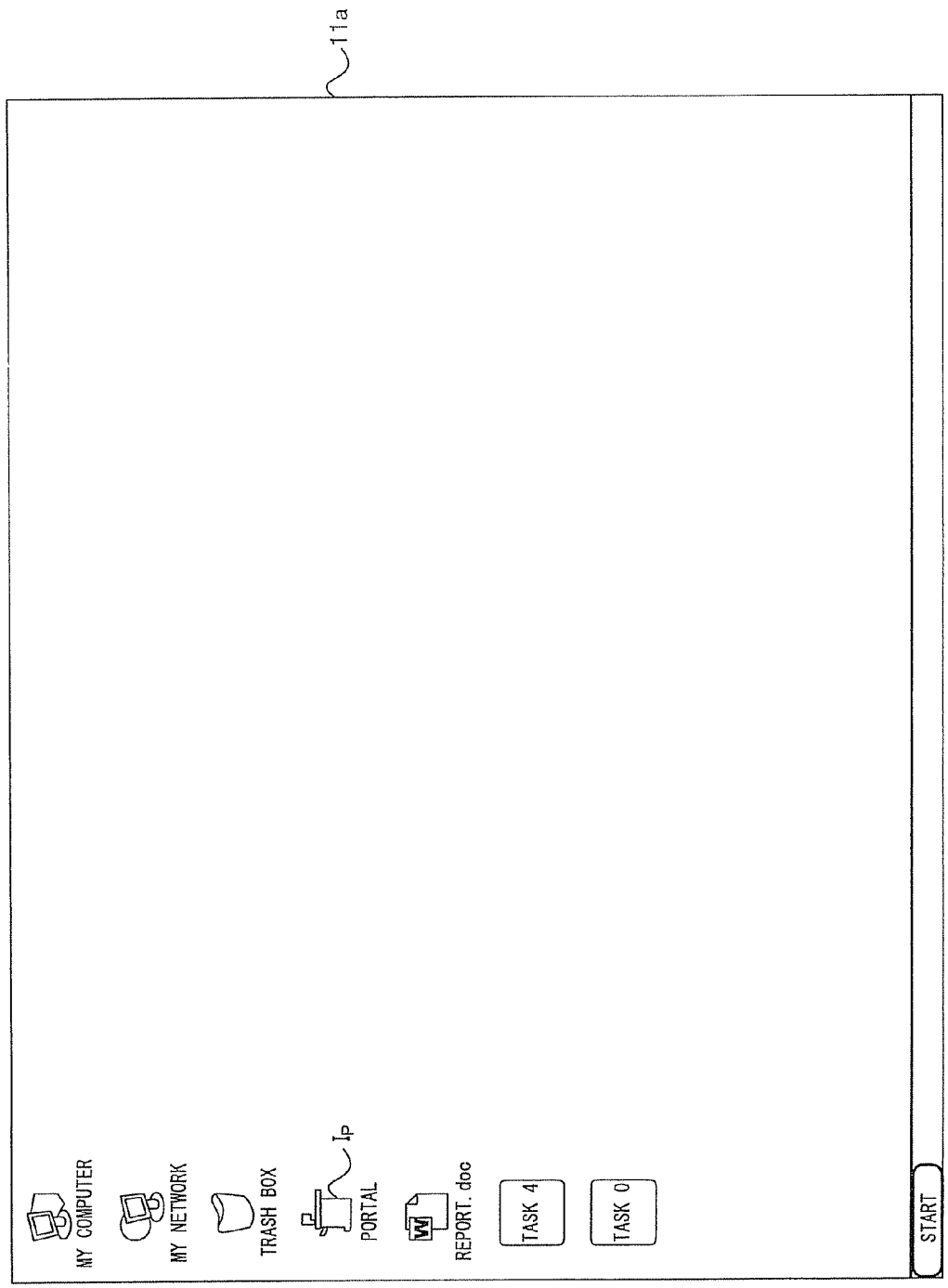
FIG. 4 is a view showing an exemplary display screen on a display 11a in the PC 11.

FIG. 4 is a view showing an exemplary display screen of the display 11a in the PC 11. On the display 11a, a "Portal" icon $I_P$ is displayed together with various icons such as "My Computer" and "My Network".

Figure 5:
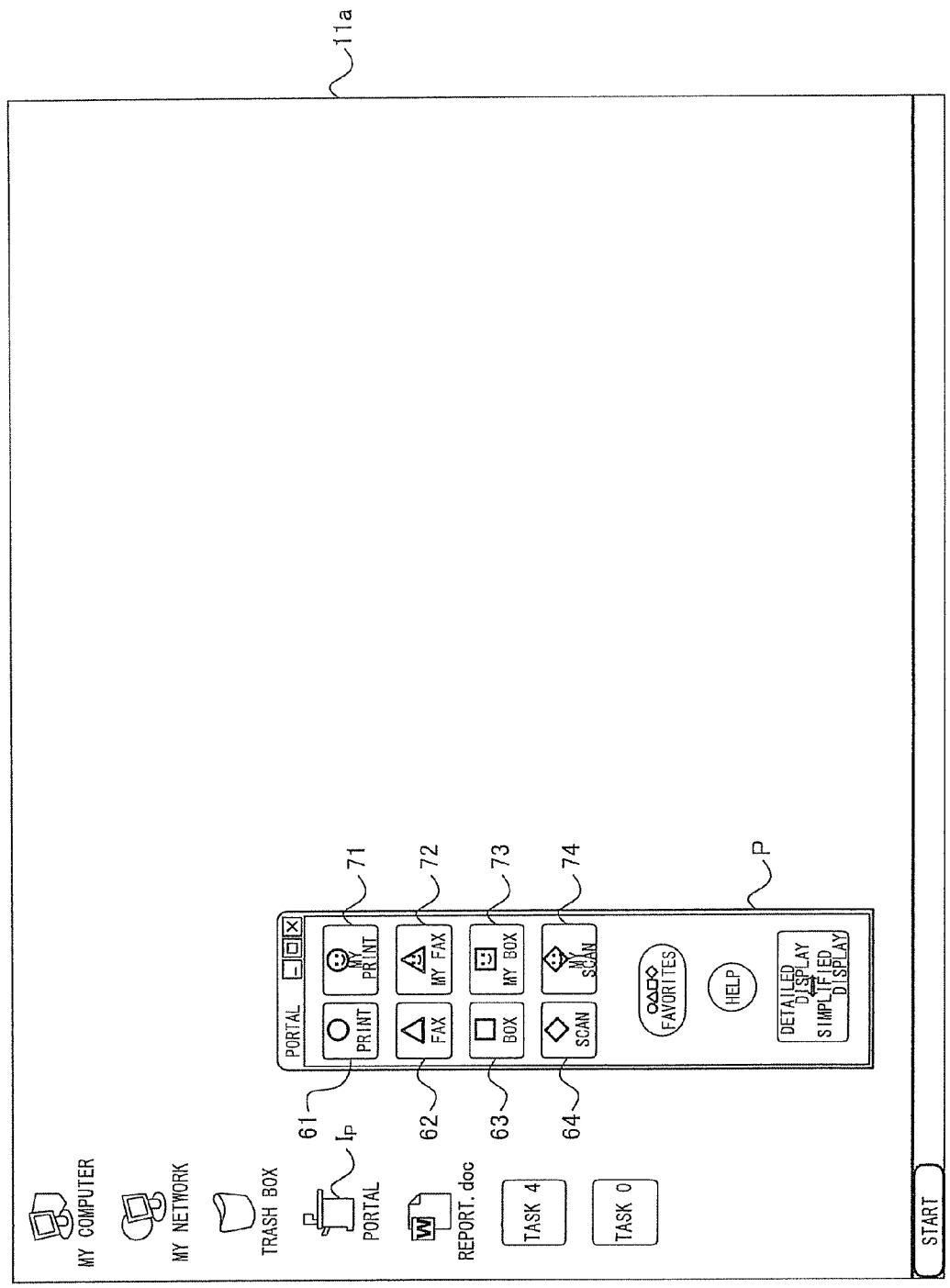
FIG. 5 is a view showing an exemplary display of a portal screen P.
Figure 6:
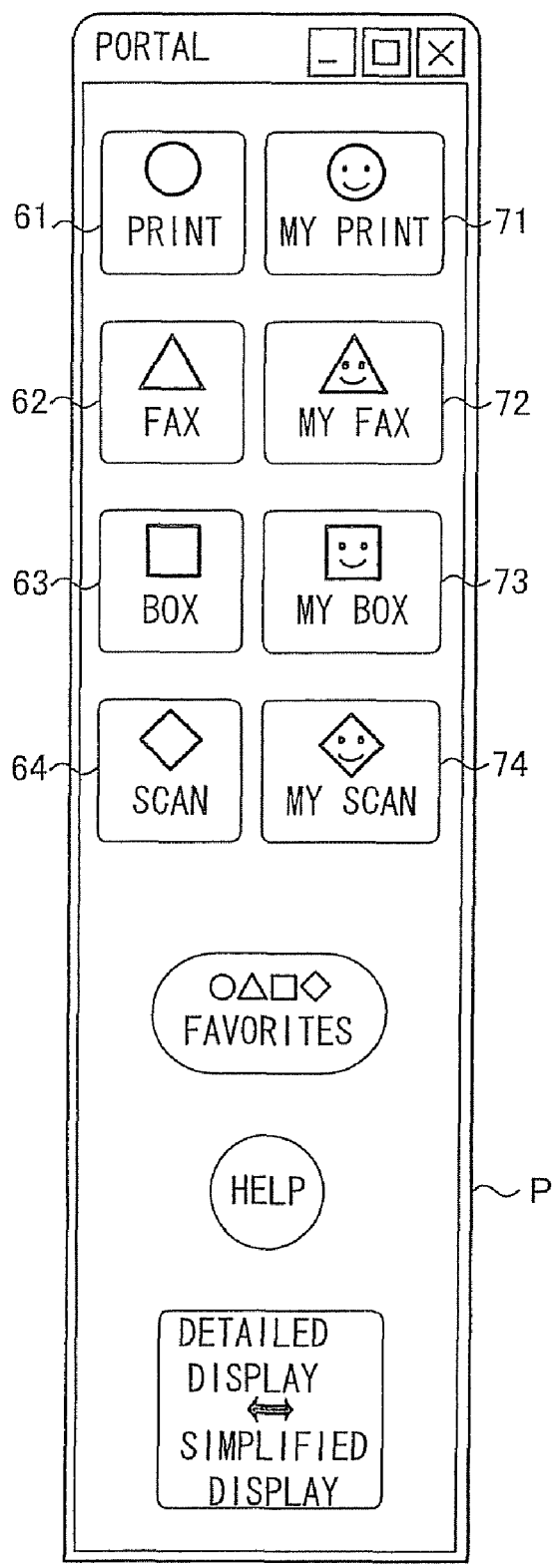
FIG. 6 is a view showing the details of the portal screen P.

As the user selects this "Portal" icon $I_P$ by an operation input (double-clicking or the like) to the operation input unit 11b, a portal screen P as shown in FIG. 5 is displayed within the screen of the display 11a. In the portal screen P, buttons 61-64 for opening setting screens (driver screens) to carry out traditional standard function setting, and buttons 71-74 for opening my-setting screen (customized driver screens) corresponding to each function which each user can customize, are displayed. FIG. 6 is a view showing the details of the portal screen P. In this manner, on the portal screen P, it is clearly expressed that the setting operation is possible also for functions other than the print function that are executable in the image processing apparatus 21.

Figure 7:
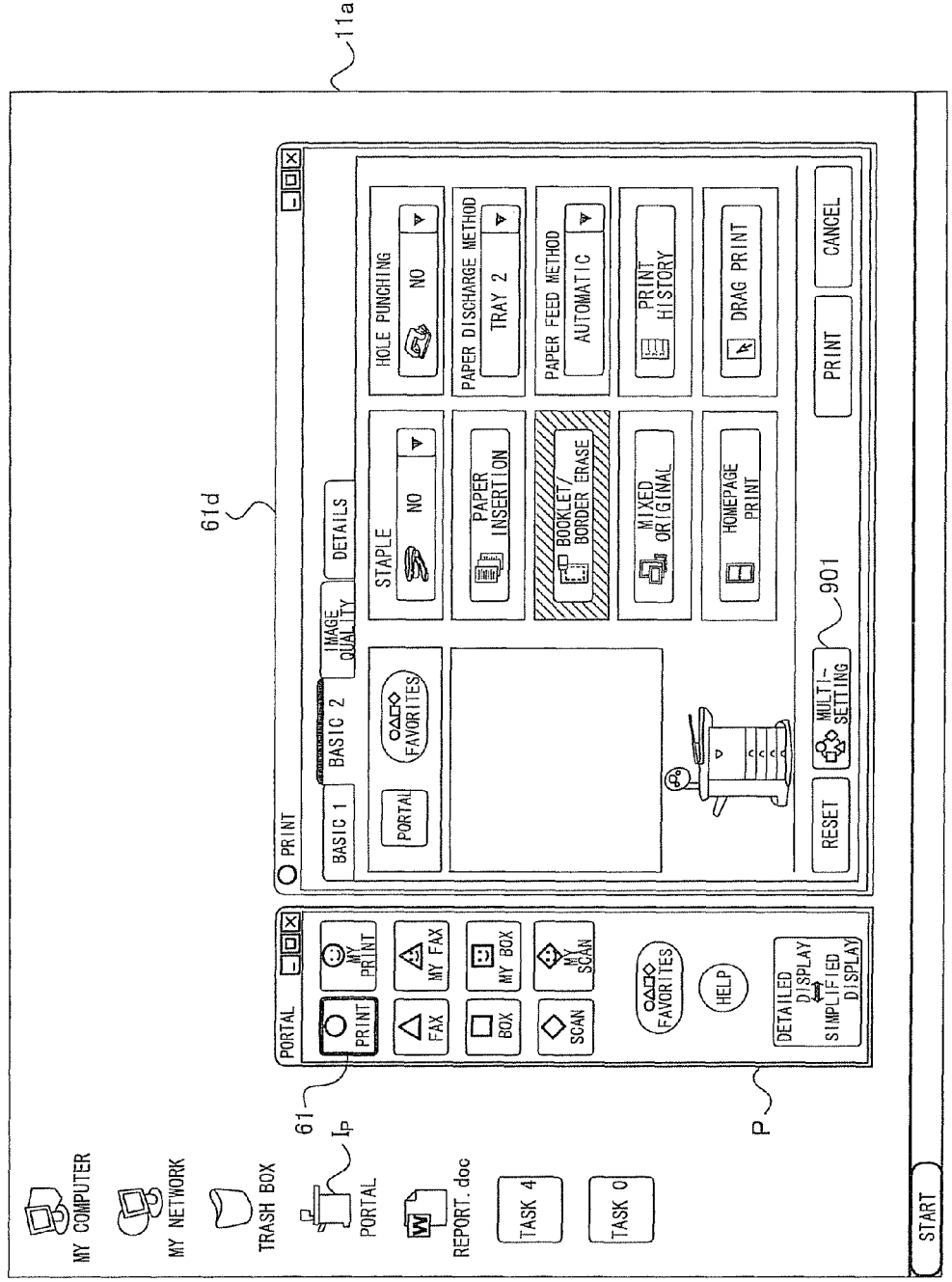
FIG. 7 is a view showing a standard print setting screen.

Here, if the user wants to, for example, carry out print setting in a standard setting screen for the print function, the user can select the button 61 by using the operation input unit 11b, thereby causing a standard print setting screen 61d as shown in FIG. 7 to be displayed. (Hereinafter, the state where a button or the like on the screen has been selected is expressed by a bold line surrounding the button as shown in FIG. 7.)

Figure 8:
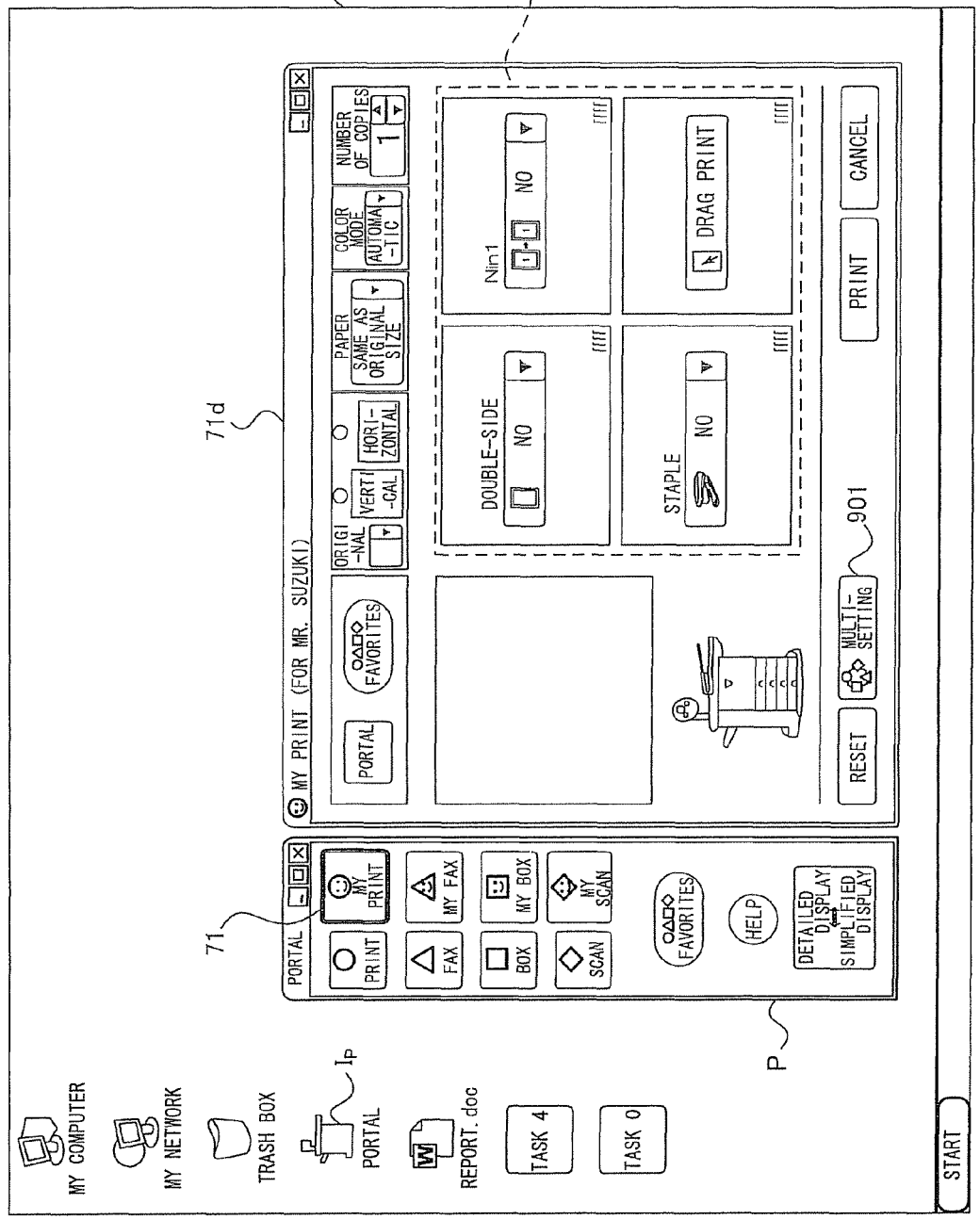
FIG. 8 is a view showing a setting screen in which a setting item registered in advance corresponding to a user for a print function is arranged within a display area S.

Meanwhile, if the user wants to use a print setting screen that can be customized and selects the button 71 by using the operation input unit 11b, a setting screen is displayed in which a setting item registered for the print function in advance corresponding to the user (a setting item that should be displayed in the setting screen) is arranged within a display area S, as shown in FIG. 8.

In this manner, since only a setting item that should be displayed in the setting screen, of various setting items corresponding to the plural functions of the image processing apparatus, is selectively displayed in the display area S of the setting screen, diverse setting items can be displayed on the screen with higher browsability, and an interface screen can be provided in which the user can easily carry out setting.

The number of setting items displayed at a time in the display area S can be set to a predetermined number as default setting, but it may also be set arbitrarily in accordance with an operation input from the user. Also, if the size of the icon images or the like of the setting items to be displayed as a list in the display area S, and the size of the characters representing each setting item are changed in accordance with the number of items to be displayed (when the number of items is small, the area used for each item is increased and the character size is increased), it can contribute further to improvement in visibility of each setting item.

Also, as described above, even for different setting items that are generally displayed on separate tabs in the printer driver and setting items that are usually located in a deeper hierarchical level (for example, setting items having low frequency of use in general), those having higher frequency of use may be registered as display targets in the setting screen, thus leading to improvement in visibility and operability in the setting operation.

Next, procedures for registering a setting item as a display target by using the operation input unit 11b will be described.

Figure 9:
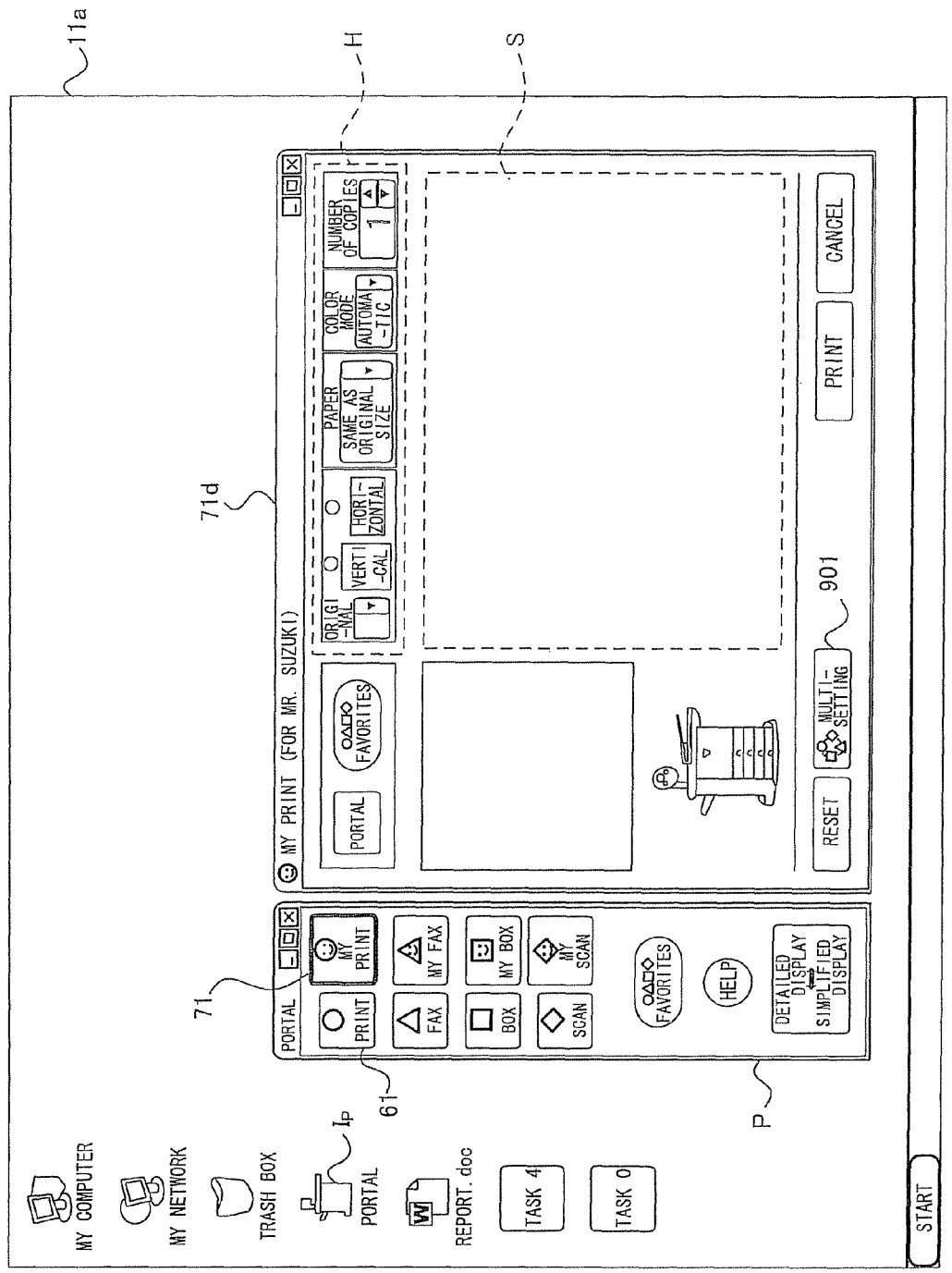
FIG. 9 is a view showing a print setting screen that is displayed when a my-print button is selected in the state where no setting item to be displayed in a predetermined display area S has been registered.

FIG. 9 is a view showing a print setting screen 71d displayed in the case where the "My Print" button 71 is selected in the state where no setting item to be displayed in the predetermined display area S has been registered.

Figure 10:
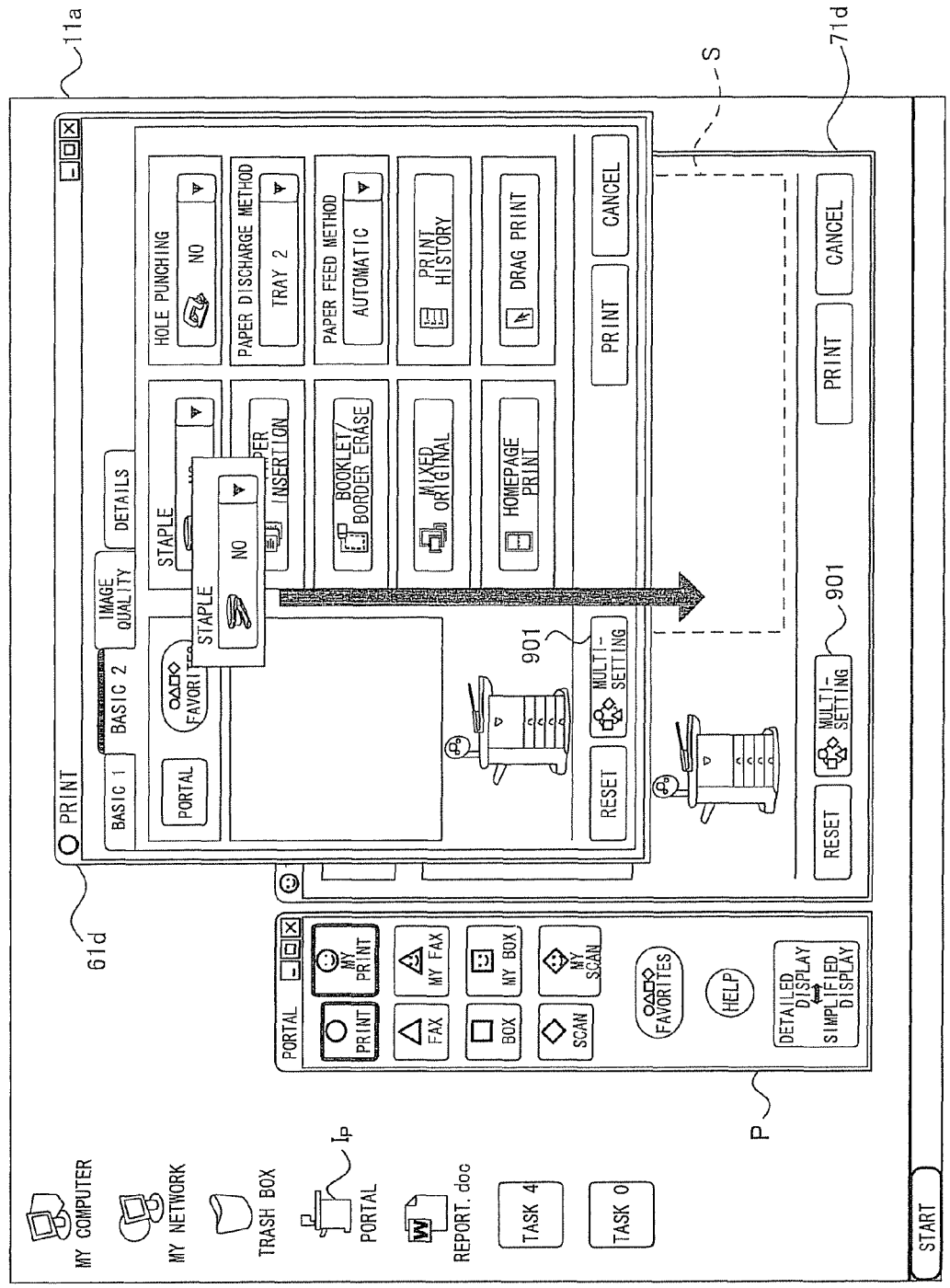
FIG. 10 is a view for explaining a method of calling each driver screen.

If the user selects the "print" button 61 in the portal screen P in the state of FIG. 9, the standard print setting screen 61d is displayed together with the print setting screen 71d, as shown in FIG. 10.

The user, using a mouse or the like, drags a setting item (here, "Staple") that the user wants to display in the display area S in the print setting screen 71d (that the user wants to add to the setting items on the setting screen for the user's exclusive use) from plural setting items displayed in the print setting screen 61d displayed as described above, and the user moves the setting item to the above display area S in the print setting screen 71d and drops it there (see the arrow in FIG. 10).

As the drag-and-drop operation as described above is carried out and thus enables registration of a desired setting item as a display target in the display area S of the print setting screen 71d, it becomes possible to customize the setting screen with a higher degree of freedom.

In this embodiment, for a setting item that can be registered as a display target in the display area S of the print setting screen 71d by the above drag-and-drop operation, the background color in the print setting screen 61d is a light color, and for a setting item that cannot be registered (that cannot be dragged and dropped), the background color is a dark color (see, for example, "Booklet/Border Erase" in FIG. 7). Thus, the user can visually grasp the setting item that can be registered as a display target in the display area S of the print setting screen 71d.

Next, procedures for execution commands for various processing functions by the driver apparatus according to this embodiment will be described.

Figure 11:
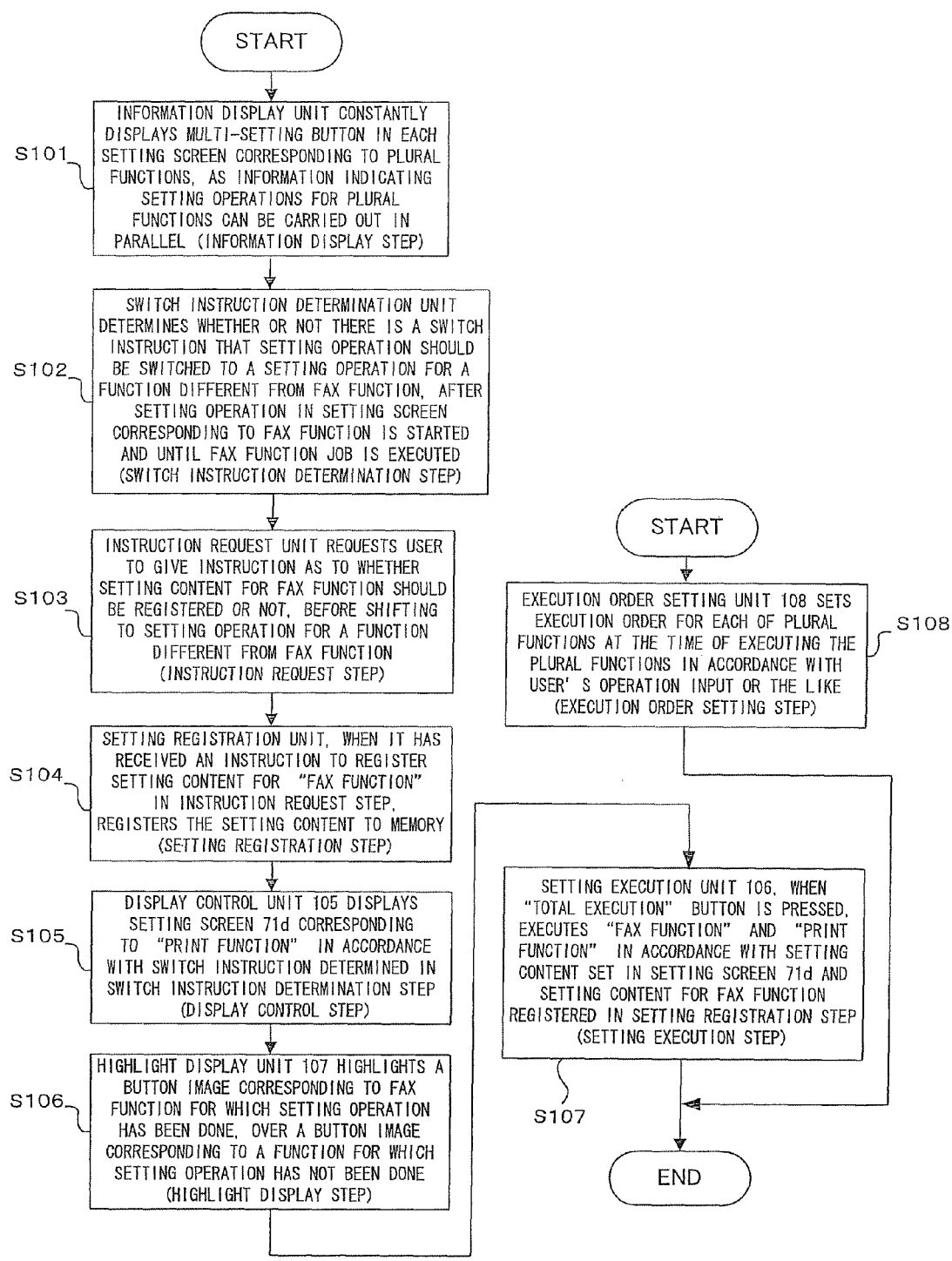
FIG. 11 is a flowchart for explaining a flow of processing in the driver apparatus according to the embodiment.
Figure 12:
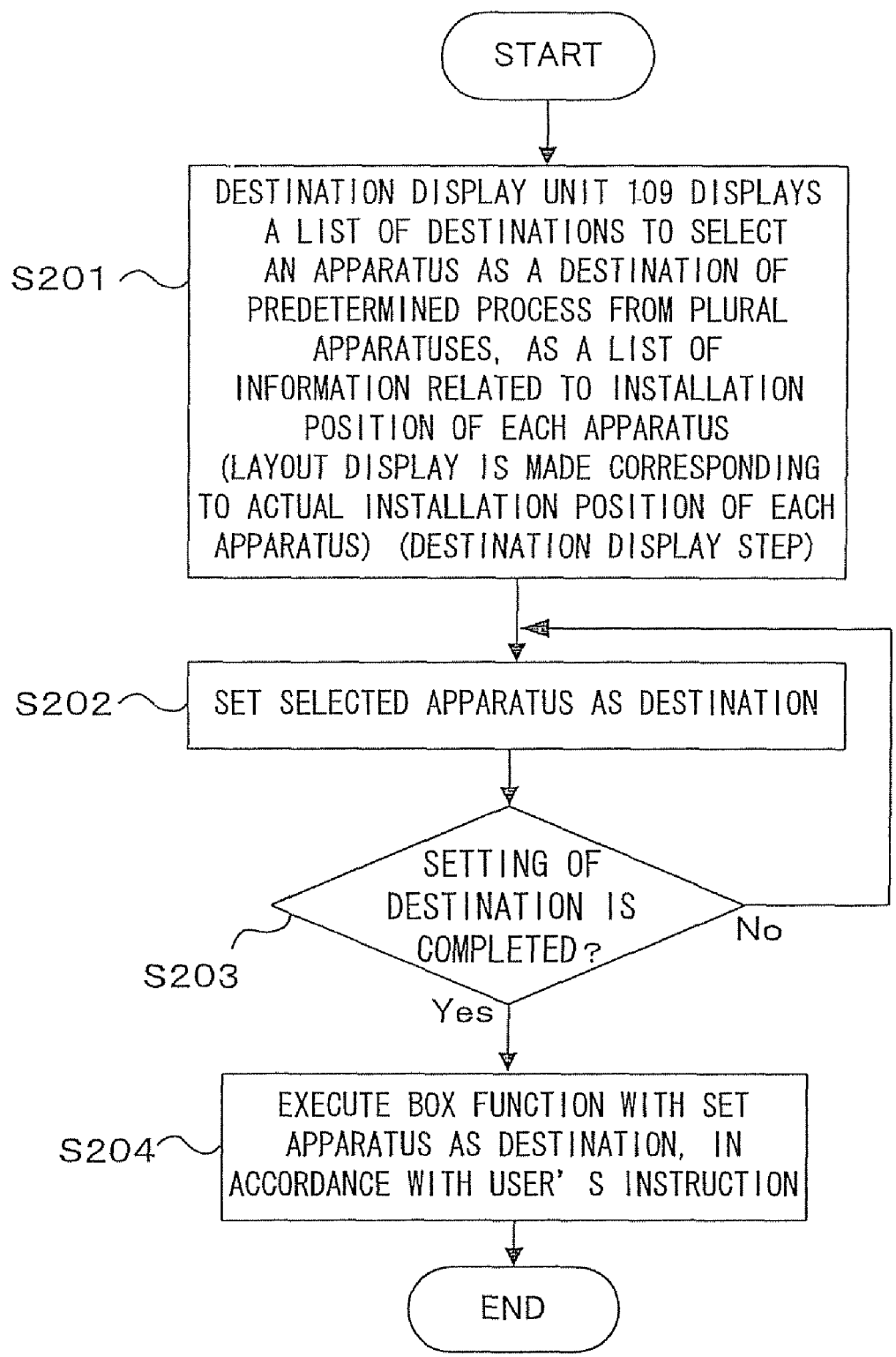
FIG. 12 is a flowchart for explaining a flow of processing in the driver apparatus according to the embodiment.

FIG. 11 and FIG. 12 are flowcharts for explaining a flow of processing in the driver apparatus according to this embodiment. Here, as an example, a flow of processing in the case of carrying out the setting operation for the fax function, then carrying out the setting operation for the print function, and executing the two functions at one execution command, will be described. Here, the setting for multitasking processing of a combination of the "fax function" and the "print function" is described for convenience in the description, but as a matter of course, the processing is not limited to this combination and similar processing is possible for combinations of other functions.

Figure 13:
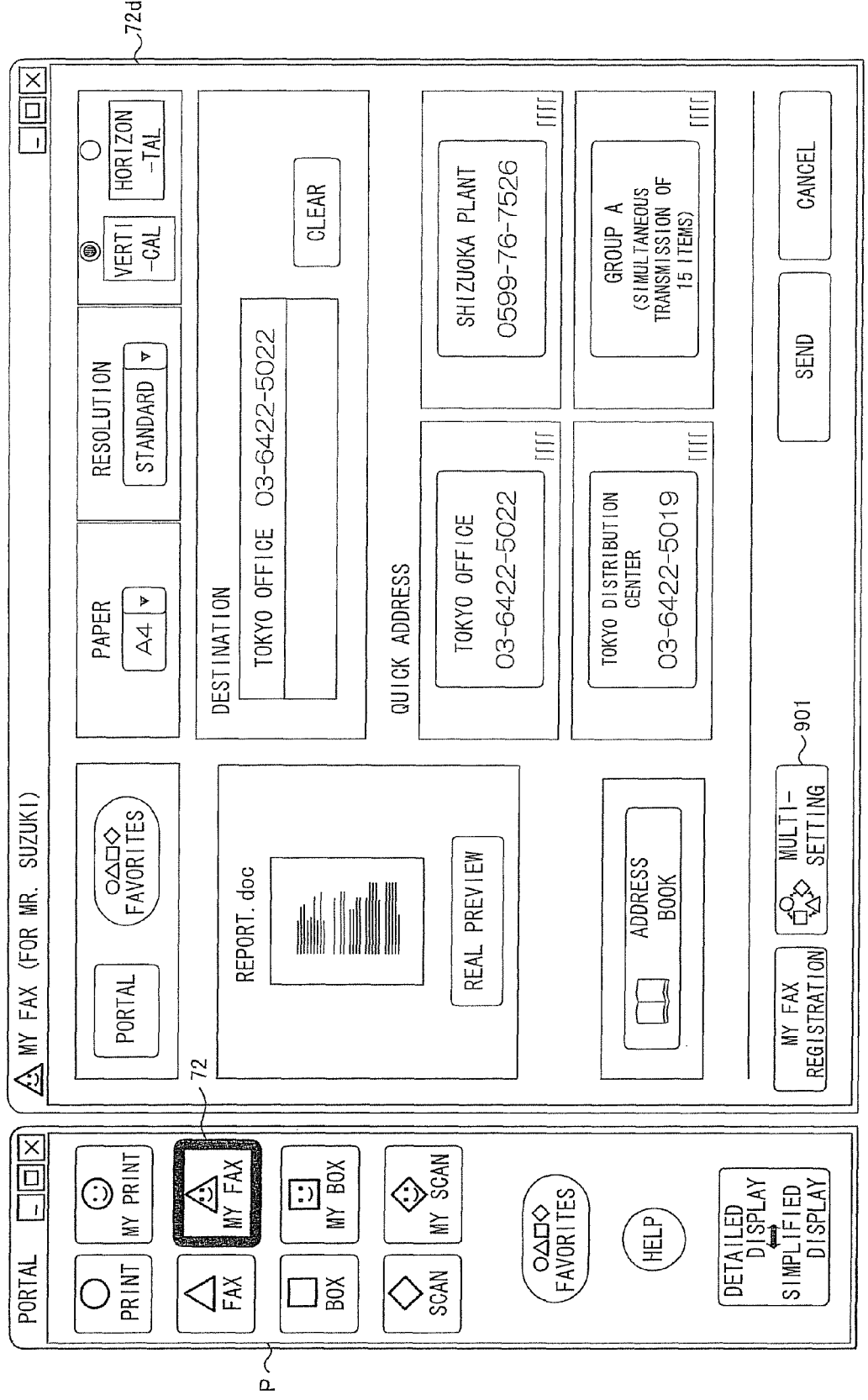
FIG. 13 is a view showing an example of a setting screen 72d for the fax function.

As shown in FIG. 13, when the button 72 in the portal screen P is selected, the setting screen 72d for the fax function is displayed. The information display unit 101 constantly displays a "Multi-setting" button 901 as information indicating that setting operations for plural functions can be carried out in parallel, in each of the setting screens corresponding to the "print function", "fax function", "box function" and "scanner function" (information display step) (S101). In the case where the setting screen for each function has tab representations divided into plural hierarchical levels, the information display unit 101 displays the "Multi-setting" button 901 on all the tab screens.

Figure 14:
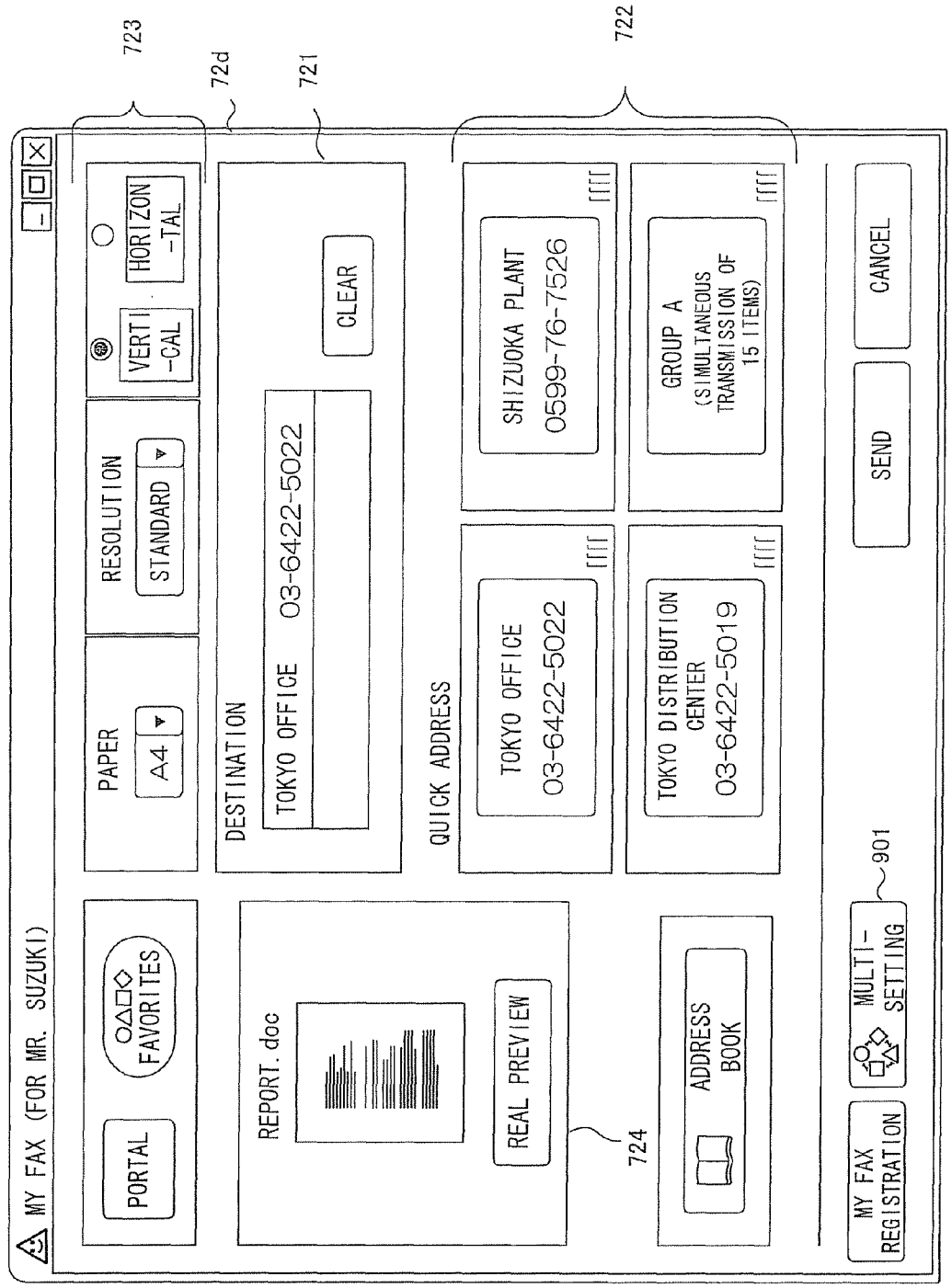
FIG. 14 is a view showing details of the setting screen 72d for the fax function.

FIG. 14 is a view showing the details of the setting screen 72d for the fax function. As shown in FIG. 14, setting items 723 for setting the "paper size" of a page to be faxed, and the "resolution" and "direction of page" of data to be faxed are displayed in the upper part of the setting screen 72d. In the lower part of the screen, a destination list 722 for fax transmission that has registered in advance is displayed as a list. In the middle part of the screen, a destination setting screen 721 for setting a destination selected form the destination list 722 or a destination that is directly inputted by an operation input is displayed. Also, in the middle of the left part of the screen, a preview screen 724 is displayed that shows a preview of the state of image data faxed in accordance with the content that is set with the setting items as described above. Also, the "Multi-setting" button 901 is constantly displayed at the bottom of the setting screen 72d.

The user carries out the setting operation on this setting screen 72d and selects a "Send" button, and thus can cause the image processing apparatus 21 to execute fax transmission processing based on the setting content.

The switch instruction determination unit 102 determines whether there is a switch instruction that the setting operation should be switched to the switching operation for a function different from the "fax function", during the period after the setting operation in the setting screen 72d corresponding to the "fax function" is started and until the job of the fax function is executed (switch instruction determination step) (S102).

Specifically, in the switch instruction determination step, the selection of the "Multi-setting" button 901 displayed in the information display step (predetermined operation input) is determined as a switch instruction that the setting operation should be switched to the setting operation for a function other than the "fax function".

Also, in the switch instruction determination step, the pressing of a button (for example, the "print" button 61, "box" button 63, "scan" button 64, "My Print" button 71 to "My Scan" button 74) for calling the setting screen for a function other than the "fax function" in order to call the setting screen corresponding to a function other than the "fax function" (predetermined operation input) can be determined as a switch instruction that the setting operation should be switched to the setting operation for a function other than the "fax function".

Figure 15:
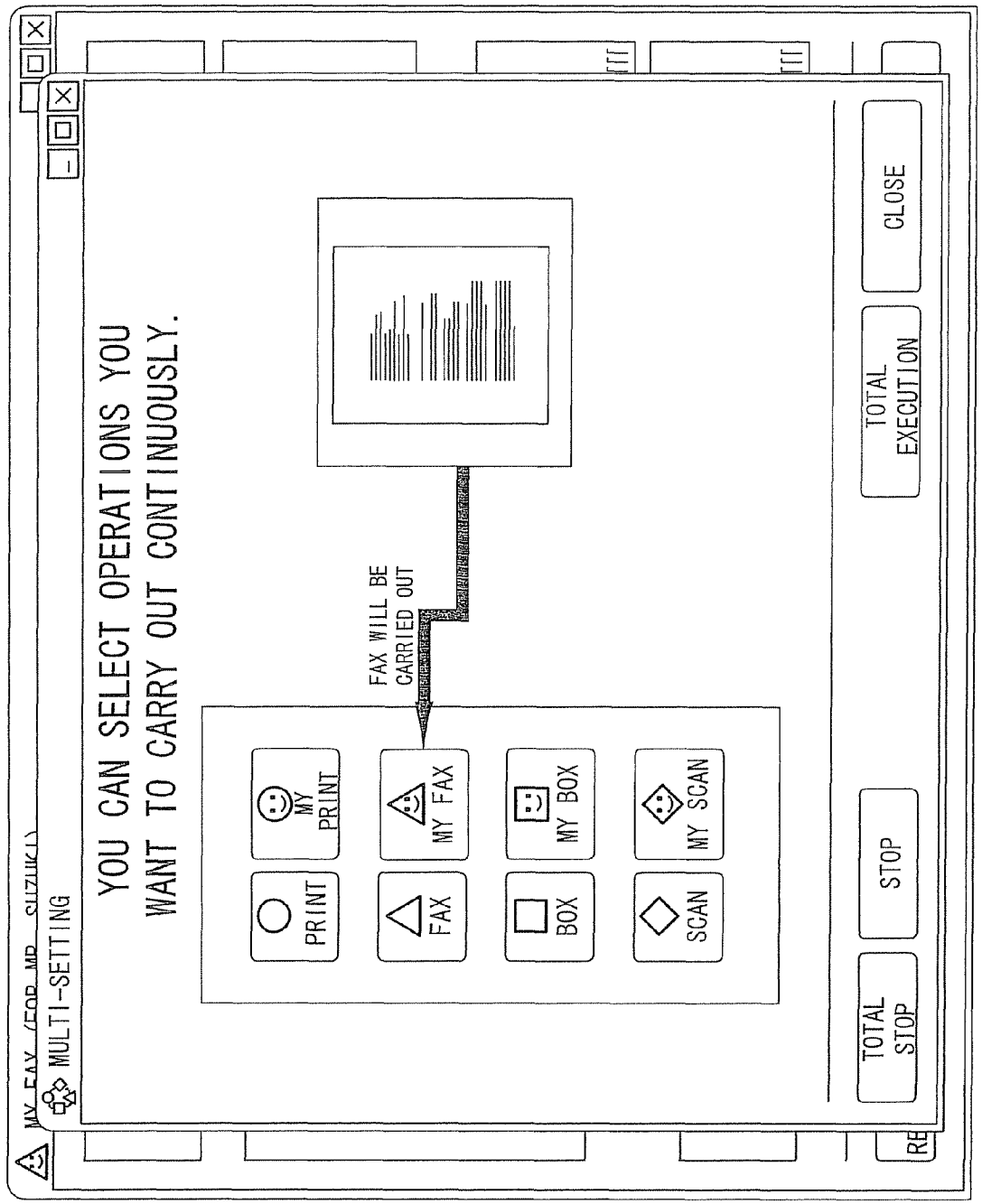
FIG. 15 is a view showing an exemplary screen display in the case where a "multi-setting" button 901 is pressed.

FIG. 15 is a view showing an exemplary screen display in the case where the "Multi-setting" button 901 is pressed. As shown in FIG. 15, as the "Multi-setting" button 901 is pressed, information indicating that the setting operation for functions other than the fax function can be carried out in parallel is displayed on the screen. On the screen shown in FIG. 15, as an icon corresponding to a function other than the fax function is selected, the setting operation for the function other than the fax function can be carried out subsequently.

Figure 16:
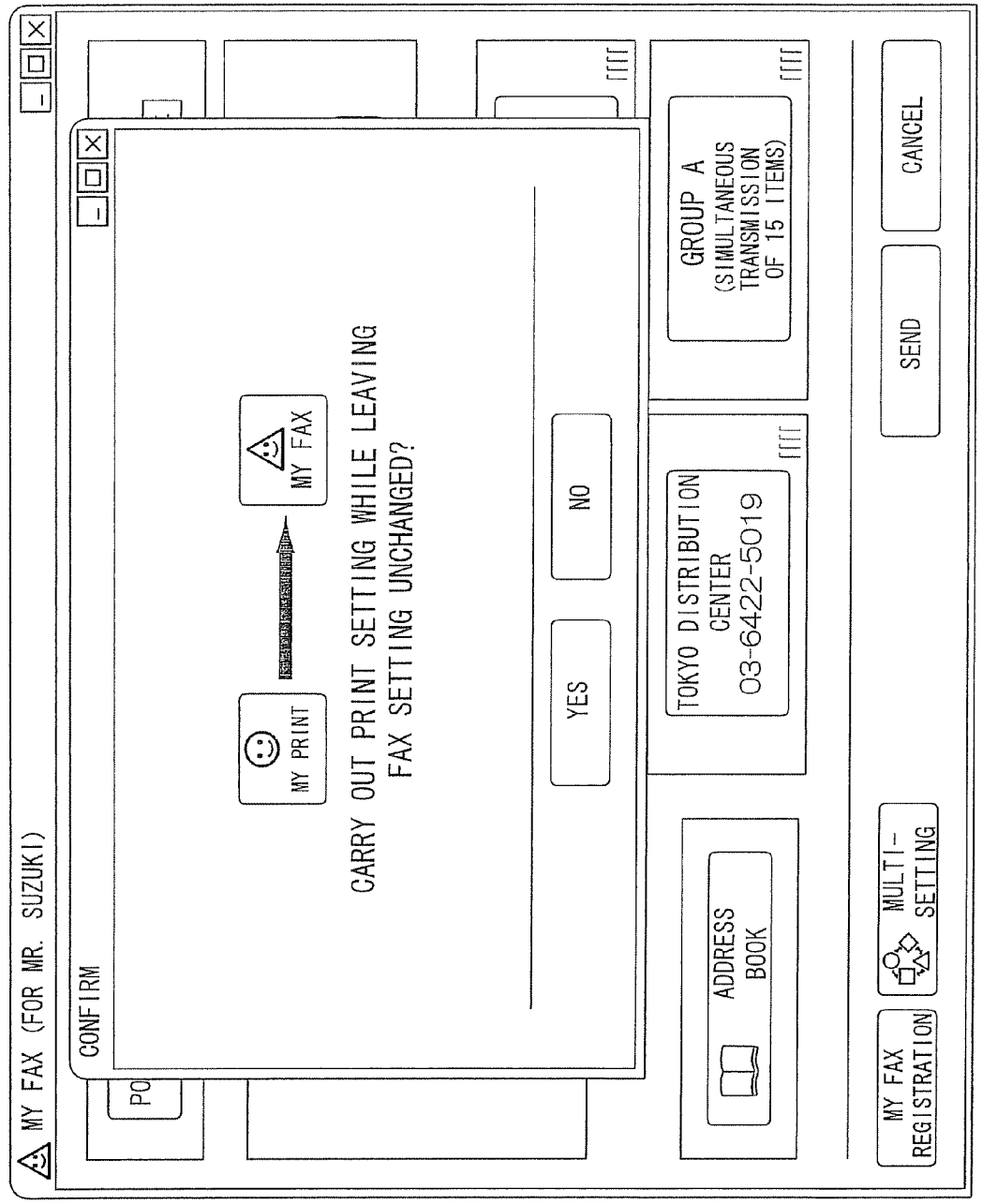
FIG. 16 is a view showing an example in which an instruction request by an instruction request unit 103 is displayed on the screen.

Here, in the case where it is determined in the switch instruction determination step that there is a switch instruction, the instruction request unit 103 requests the user to give an instruction as to whether the setting content for the "fax function" should be registered or not, before shifting to the setting operation for the function other than the "fax function" (instruction request step) (S103). FIG. 16 is a view showing an example in which an instruction request by the instruction request unit 103 is displayed on the screen.

In the case where the setting registration unit 104 has received an instruction that the setting content for the "fax function" should be registered, in the instruction request step (in the case where the "Yes" button is selected on the screen shown in FIG. 16), the setting registration unit 104 registers the setting content to the memory 802 (setting registration step) (S104).

The display control unit 105 displays the setting screen 71*d* corresponding to the "print function" in accordance with the switch instruction (assuming that the "My Print" button 71 has been selected) determined in the switch instruction determination step (display control step) (S105).

Figure 17:
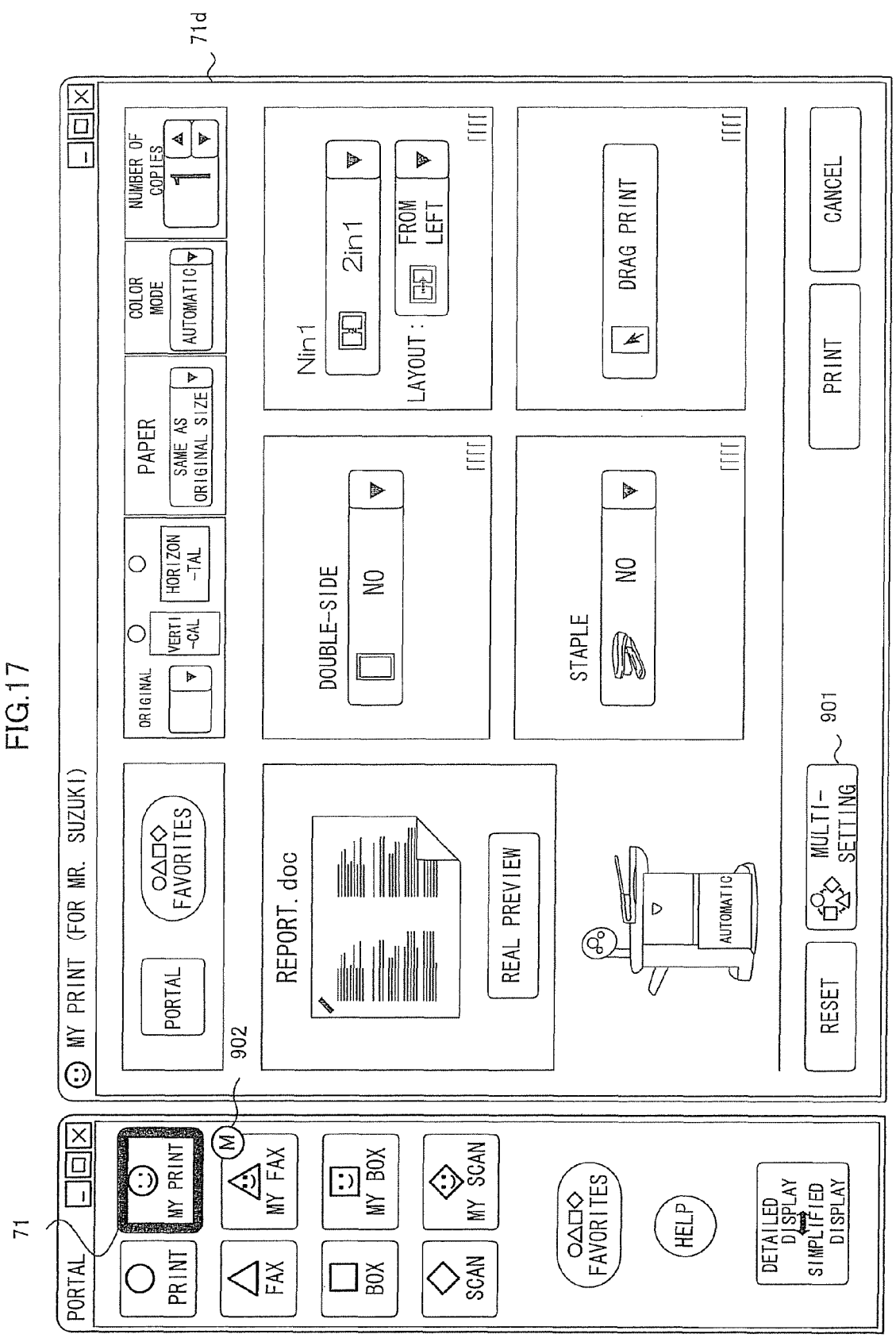
FIG. 17 is a view showing a mark 902 indicating that setting operations are carried out in parallel by multi-setting.

The highlight display unit 107 highlights the button image corresponding to the fax function for which the setting operation has been done, over the button images of the functions for which the setting operation has not been done (for example, the "My Box" function, "My Scan" function and the like) (highlight display step) (S106). Here, the highlight display unit 107 displays a mark 902 indicating that the setting operation is being carried out in parallel in accordance with multi-setting, in a manner of overlapping the button image corresponding to the fax function, as shown in FIG. 17. The method of highlight display by the highlight display unit 107 is not limited to the overlapping display of a mark as described above, but it can be, for example, a change in font, display color, brightness, shape, thickness of line, type of line, pattern and size of flash, notification by voice, and so on.

Figure 18:
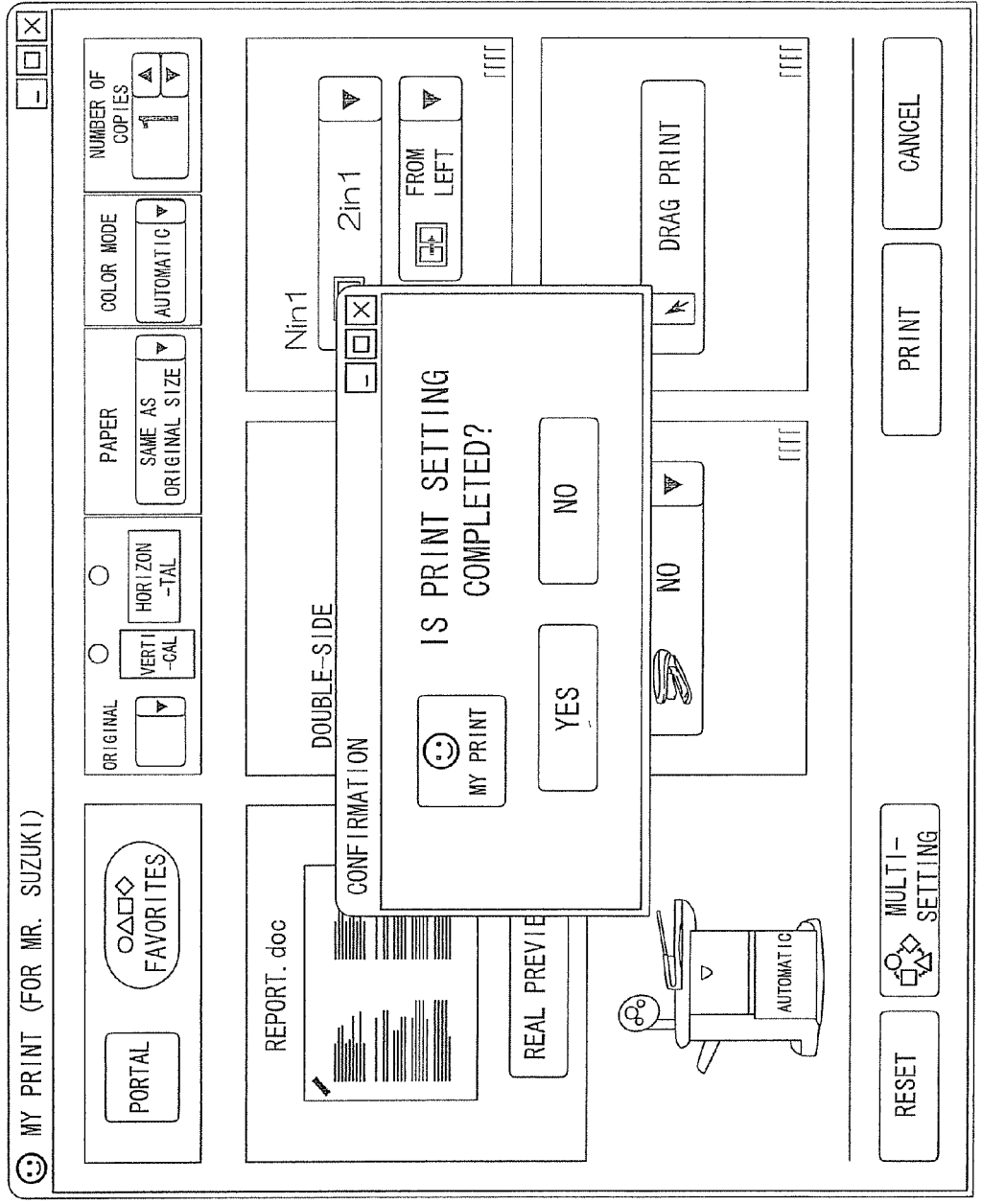
FIG. 18 is a view showing an exemplary confirmation screen.
Figure 19:
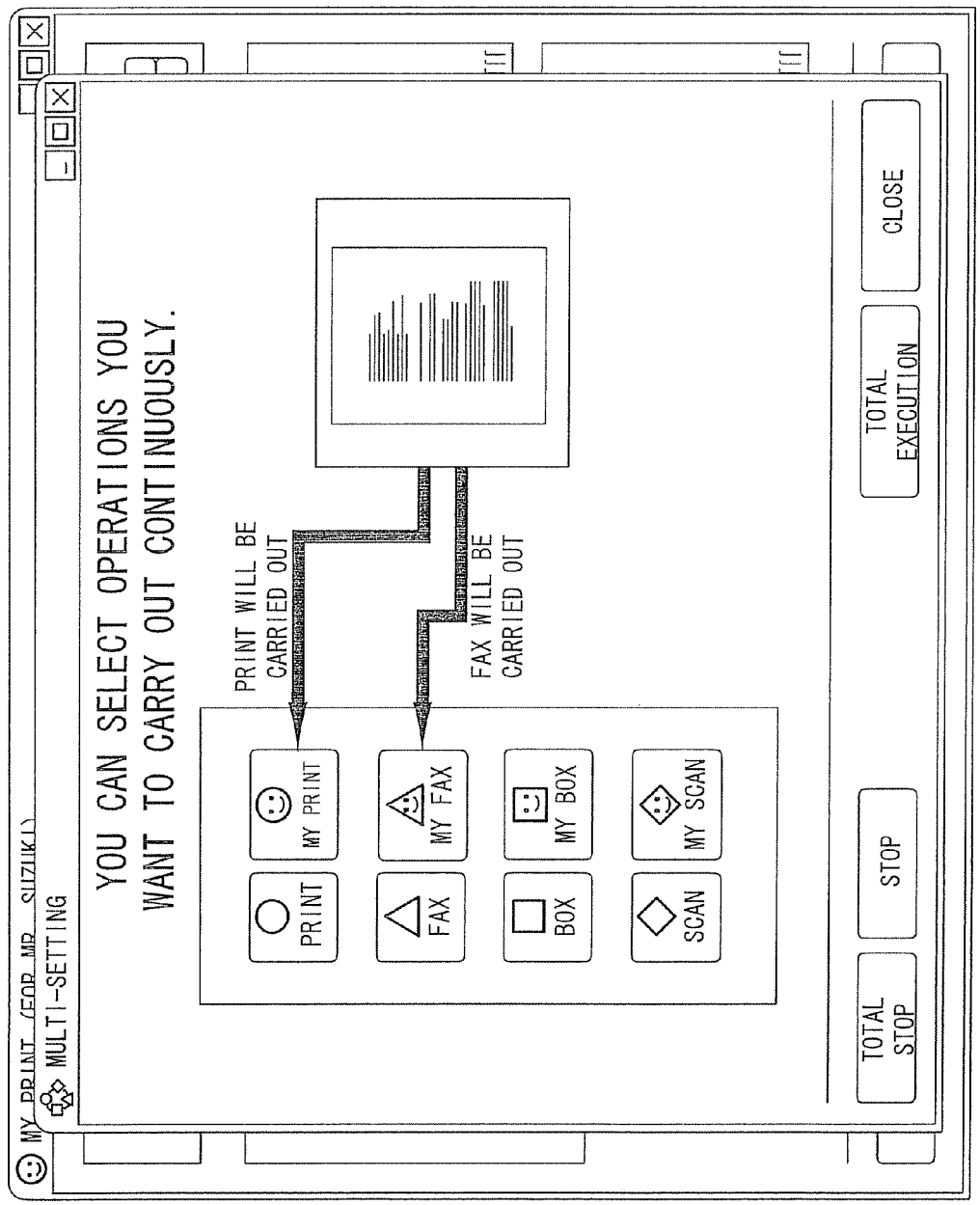
FIG. 19 is a view showing an exemplary confirmation screen.
Figure 20:
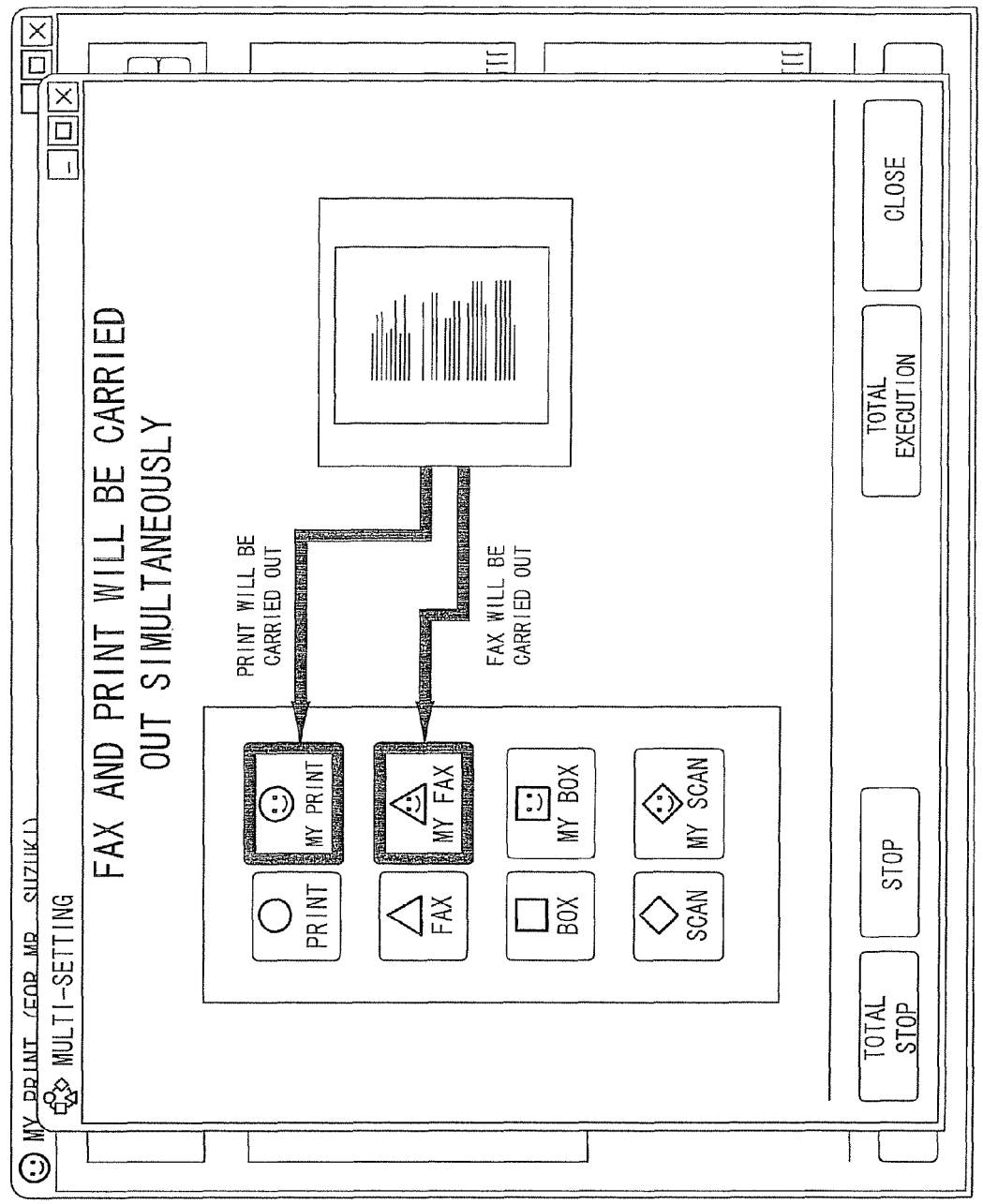
FIG. 20 is a view showing a screen to instruct total execution of set functions.

When the print setting by the user is completed and the "Print" button on the setting screen 71*d* is pressed by the user, the setting execution unit 106 assumes that an execution command based on the setting contents for the "fax function" and "print function" has been received, and displays a confirmation screen shown in FIG. 18. When the "Yes" button indicating permission of execution is pressed in this confirmation screen, the setting execution unit 106 displays a screen shown in FIG. 19. When the "Total Execution" button is pressed in the screen shown in FIG. 19, the setting execution unit 106 assumes that the setting operation for other functions needs not be carried out, and displays a screen shown in FIG. 20. When the "Total Execution" button is pressed in the screen shown in FIG. 20, the setting execution unit 106 causes the "fax function" and "print function" to be executed in accordance with the setting content set in the setting screen 71*d* and the setting content for the fax function registered by the setting registration step (setting execution step) (S107).

Also, apart from the above steps S101-S107, the execution order setting unit 108 sets the execution order for each of the plural functions in executing the plural functions in accordance with an operation input or the like from the user (execution order setting step) (S108). In the setting execution step, each of the plural functions is executed in the order that is set in the execution order setting step. That is, the execution timing of each of the plural functions set in parallel by multi-setting may be simultaneous, or these functions may be sequentially executed in a predetermined order. Here, in the execution order setting step, the execution order for each function can also be set in accordance with a predetermined rule, for example, the order from light processing load, the order from short processing time, or the order from high frequency of use.

Next, the setting operation for a predetermined processing function using, as a destination, at least one of the plural apparatuses connected to the image processing apparatus 21 in a manner that enables communication, in the driver apparatus according to this embodiment will be described.

Figure 21:
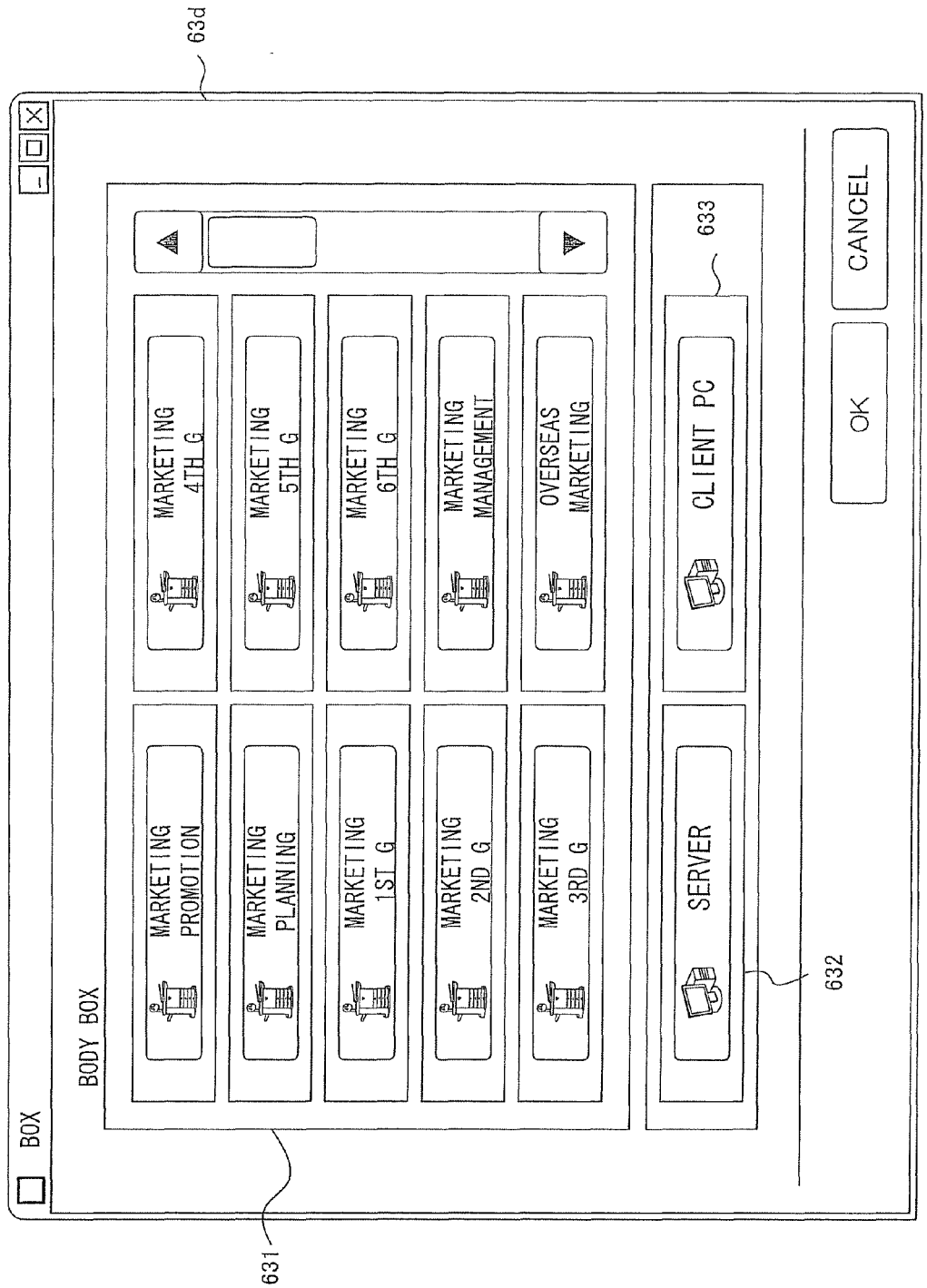
FIG. 21 is a view showing a setting screen 63d to execute the "box" function in the image processing apparatus 21.

FIG. 21 is a view showing a setting screen 63*d* for executing the "box" function in the image processing apparatus 21. In the image processing apparatus 21, by the "box" function, image data acquired by scanning an original in the image processing apparatus 21 and various data sent from the PC 11 and the like can be stored into the storage area of the memory 802 provided in the image processing apparatus 21 or the storage area of an external device connected to the image processing apparatus 21 in a manner that enables communication.

As shown in FIG. 21, the setting screen 63*d* shows destinations that can be a data storage destination in accordance with the "box" function. In the setting screen 63*d* in this case, each folder 631 in a "Body Box" provided in the image processing apparatus 21, a button 632 for proceeding to selection of a server connected to the image processing apparatus 21 in a manner that enables communication, and a button 633 for proceeding to selection of a client PC are displayed.

Figure 22:
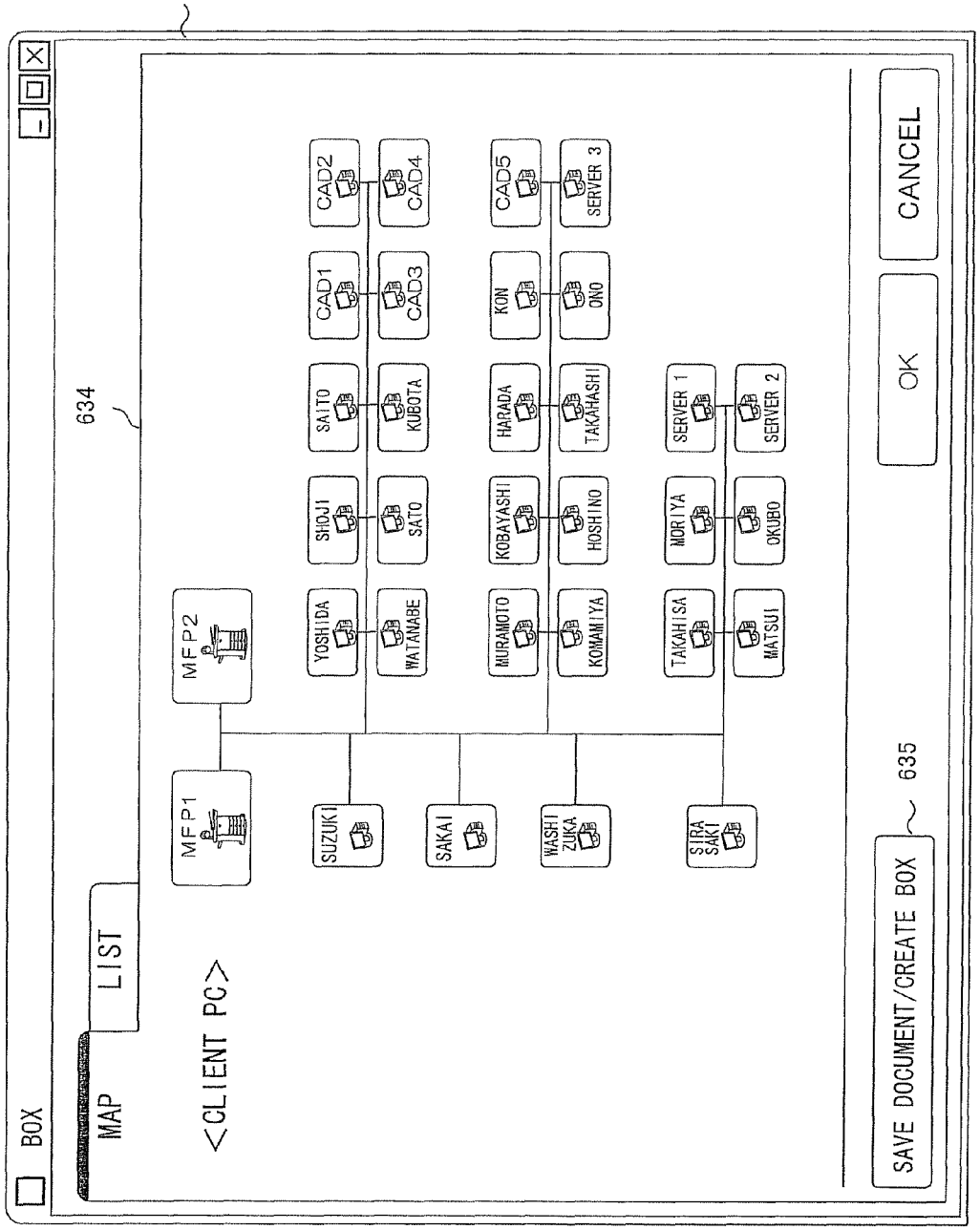
FIG. 22 is a view showing an exemplary screen display by a destination display unit 109 in the case where a user has pressed a button 633.

FIG. 22 is a view showing an exemplary screen display of the destination display unit 109 in the case where the user has pressed the button 633. As shown in FIG. 22, the destination display unit 109 displays a destination list for selecting an apparatus to be the destination of predetermined processing from plural apparatuses, as a list 634 of information related to the installation position of each apparatus (layout display corresponding to the actual installation position of each apparatus) (destination display step) (S201). On the screen shown in FIG. 22, the user name and the apparatus icon are associated with each other in the display of the list in order to enable intuitive understanding of which user uses each apparatus as a destination candidate.

Figure 23:
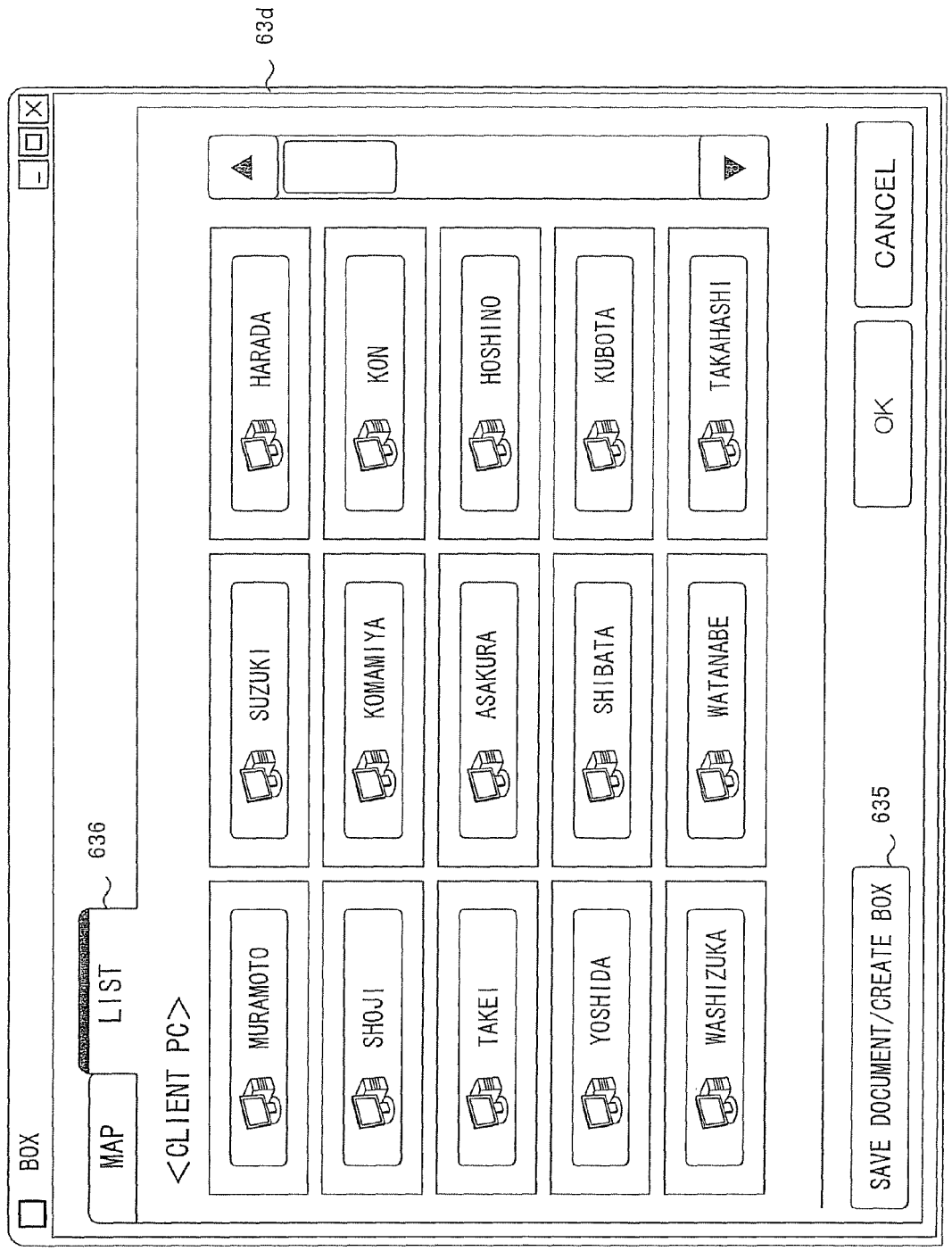
FIG. 23 is a view showing an example of a general screen display by the destination display unit 109 in the case where a user has pressed the button 632.

FIG. 23 is a view showing an example of a typical screen display 636 displayed by the destination display unit 109 in the case where the user has pressed the button 632.

As the user selects a desired apparatus from the destination list displayed on the screen by the destination display unit 109 in the above-described manner, the apparatus is set as a destination (S202).

When the setting of the destination is completed (S203, Yes), the box function using the apparatus that has been set as described above, as the destination, is executed in accordance with the pressing of a "Save Document/Create Box" button 635 by the user (S204).

Each step in the above processing in the driver apparatus is realized, for example, by causing the CPU 801 to execute a process control program stored in the memory 802.

Generally, in the traditional interface screen for selecting a desired destination apparatus from plural apparatuses as described above, in most cases, the apparatuses are displayed in an array in the order of identification number or the like. However, if the machine type name, identification character string and the like for identifying the apparatus which the user wants to use as the destination are unclear when the operation to select the apparatus to be the destination is actually carried out, there is only information about the registration order or the like other than the name and therefore it is difficult to specify the machine type. Therefore, the name must be rechecked by a certain means or another. Particularly, since the names of servers are decided by the network manager, these names are often arrays of numerals and alphabetic letters, and general users often find it difficult to remember them.

Thus, if the on-screen layout of the server, the client PC, the image processing apparatus and the like that can be a destination candidate in the setting screen is caused to correspond to the actual layout in the office, as in this embodiment, even when the user does not clearly remember the machine type names, the user can intuitively specify the machine type of a desired destination on the basis of the information about the physical installation position in the office (the server installed next to Mr. A or the like), which is information other than the machine type name.

In this manner, as the information about the apparatus to be the destination of processing and the information about the installation position of the apparatus are associated with each other in the screen display, common everyday knowledge based on the actual use such as "the MFP on the left side that I always use" can be utilized and therefore the destination apparatus can be selected easily and securely.

In the above embodiment, the example is described in which the processing related to display control of each setting item on the setting screen is carried out on the PC 11. However, the processing can also be carried out, for example, on the image processing apparatus 21. That is, the image processing apparatus 21 may have functions equivalent to the information display unit 101, the switch instruction determination unit 102, the instruction request unit 103, the setting registration unit 104, the display control unit 105, the setting execution unit 106, the highlight display unit 107, the execution order setting unit 108, the destination display unit 109, the display 11a, the operation input unit 11b, the CPU 801 and the memory 802.

Also, in the above embodiment, the example is described in which the selection of the driver screen, the setting operation and the like for each function are carried out mainly by the operation of the mouse. However, these operation are not limited to this form, and as a matter of course, they can be realized by operation input using the keyboard, touch panel and the like.

Moreover, two flows, that is, a "certainty-oriented flow", in which an operation is carried out by a wizard format from the multi-setting button in accordance with the user's level, and an "efficiency-oriented flow", in which a direct shift to another function is made from a function button in the portal screen, are prepared. Thus, the user can freely select either one of the flows and therefore even a user with little knowledge of the image processing apparatus and driver application can easily carry out the multi-setting operation.

While the case where the functions to carry out the invention have been recorded in advance in the apparatus is described in the embodiment, the functions are not limited to this form. The similar functions may be downloaded to the apparatus from a network, or the similar functions stored in a recording medium may be installed into the apparatus. The recording medium may be in any form as long as it is a recording medium that can store a program and that can be read by the apparatus, such as a CD-ROM. Also, the functions that can be acquired in advance by being installed or downloaded may be realized in cooperation with the OS (operating system) in the apparatus.

The present invention has been described in detail with the specific embodiment. However, it is obvious to those skilled in the art that various changes and modifications can be made without departing from the spirit and scope of the invention.

As described above in detail, according to the invention, a technique can be provided that contributes to improvement in convenience of the setting screen for carrying out setting for a function executable in the image processing apparatus.

What is claimed is:

1. A driver apparatus that causes plural functions executable in an image processing apparatus to be executed in accordance with a setting content set in a setting screen corresponding to each function, the driver apparatus comprising:

a switch instruction determination unit configured to determine whether, during a period after a setting operation in a setting screen corresponding to a first function is started and until a job of the function is executed, there is a switch instruction that the setting operation should be switched to a setting operation for a second function that is different from the first function;

an instruction request unit configured to request a user to give an instruction as to whether a setting content for the first function should be registered or not, when it is determined by the switch instruction determination unit that there is a switch instruction;

a setting registration unit configured to register the setting content when the instruction request unit has received an instruction that the setting content for the first function should be registered;

a display control unit configured to display a setting screen corresponding to the second function in accordance with the switch instruction determined by the switch instruction determination unit; and a setting execution unit configured to, when it has received an execution command based on setting contents of the first and second functions, execute the first and second functions in accordance with the setting content set in the setting screen corresponding to the second function and the setting content registered by the setting registration unit.

2. The driver apparatus according to claim 1, further comprising an information display unit configured to constantly display information indicating that setting operations for the plural functions can be carried out in parallel, in each of the setting screens corresponding to the first and second functions, wherein the switch instruction determination unit determines a predetermined operation input related to information displayed by the information display unit, as a switch instruction that the setting operation should be switched to the setting operation for the second function.

3. The driver apparatus according to claim 1, wherein the switch instruction determination unit determines a predetermined operation input for calling the setting screen corresponding to the second function, as a switch instruction that the setting operation should be switched to the setting operation for the second function.

4. The driver apparatus according to claim 1, further comprising a highlight display unit configured to highlight a display target corresponding to a function for which setting has been done, over a display target corresponding to a function for which setting operation has not been done.

5. The driver apparatus according to claim 1, further comprising an execution order setting unit configured to set an execution order for each of the plural functions in executing the plural functions, wherein the setting execution unit causes each of the plural functions to be executed in the order set by the execution order setting unit.

6. The driver apparatus according to claim 1, wherein the image processing apparatus is capable of executing predetermined processing using, as a destination, at least one of plural apparatuses connected to the image processing apparatus in a manner that enables communication, and the driver apparatus has a destination display unit configured to display a destination list for selecting an apparatus to be the destination of the predetermined processing from the plural apparatuses, as a list of information about installation position of each apparatus.

7. The driver apparatus according to claim 1, wherein the destination display unit shows a layout display of the information about installation position of each apparatus, corresponding to actual installation position of each apparatus.

8. A process control method causing plural functions executable in an image processing apparatus to be executed in accordance with a setting content set in a setting screen corresponding to each function, the method comprising the steps of:

determining whether, during a period after a setting operation in a setting screen corresponding to a first function is started and until a job of the function is executed, there is a switch instruction that the setting operation should be switched to a setting operation for a second function that is different from the first function;

requesting a user to give an instruction as to whether a setting content for the first function should be registered or not, when it is determined that there is a switch instruction in the step of determining a switch instruction;

registering the setting content when an instruction that the setting content for the first function should be registered has been received in the step of requesting an instruction;

displaying a setting screen corresponding to the second function in accordance with the switch instruction determined by the step of determining a switch instruction; and when an execution command based on setting contents of the first and second functions has been received, executing the first and second functions in accordance with the setting content set in the setting screen corresponding to the second function and the setting content registered by the step of registering the setting.

9. The process control method according to claim 8, further comprising the step of constantly displaying information indicating that setting operations for the plural functions can be carried out in parallel, in each of the setting screens corresponding to the first and second functions, wherein in the step of determining a switch instruction, a predetermined operation input related to information displayed by the step of displaying information is determined as a switch instruction that the setting operation should be switched to the setting operation for the second function.

10. The process control method according to claim 8, wherein in the step of determining a switch instruction, a predetermined operation input for calling the setting screen corresponding to the second function is determined as a switch instruction that the setting operation should be switched to the setting operation for the second function.

11. The process control method according to claim 8, further comprising the step of highlighting a display target corresponding to a function for which setting has been done, over a display target corresponding to a function for which setting operation has not been done.

12. The process control method according to claim 8, further comprising the step of setting an execution order for each of the plural functions in executing the plural functions, wherein in the step of executing the setting, each of the plural functions is executed in the order set by the step of setting an execution order.

13. The process control method according to claim 8, wherein the image processing apparatus is capable of executing predetermined processing using, as a destination, at least one of plural apparatuses connected to the image processing apparatus in a manner that enables communication, and the method comprises the step of displaying a destination list for selecting an apparatus to be the destination of the predetermined processing from the plural apparatuses, as a list of information about installation position of each apparatus.

14. The process control method according to claim 8, wherein in the step of displaying a destination list, a layout display of the information about installation position of each apparatus is shown corresponding to actual installation position of each apparatus.

15. A computer readable-medium storing a process control program for causing a computer to execute processing to execute plural functions executable in an image processing apparatus in accordance with a setting content set in a setting screen corresponding to each function, the program causing the computer to execute the steps of:

determining whether, during a period after a setting operation in a setting screen corresponding to a first function is started and until a job of the function is executed, there is a switch instruction that the setting operation should be switched to a setting operation for a second function that is different from the first function;

requesting a user to give an instruction as to whether a setting content for the first function should be registered or not, when it is determined that there is a switch instruction in the step of determining a switch instruction;

registering the setting content when an instruction that the setting content for the first function should be registered has been received in the step of requesting an instruction;

displaying a setting screen corresponding to the second function in accordance with the switch instruction determined by the step of determining a switch instruction; and when an execution command based on setting contents of the first and second functions has been received, executing the first and second functions in accordance with the setting content set in the setting screen corresponding to the second function and the setting content registered by the step of registering the setting.

16. The process control program according to claim 15, further comprising the step of constantly displaying information indicating that setting operations for the plural functions can be carried out in parallel, in each of the setting screens corresponding to the first and second functions, wherein in the step of determining a switch instruction, a predetermined operation input related to information displayed by the step of displaying information is determined as a switch instruction that the setting operation should be switched to the setting operation for the second function.

17. The process control program according to claim 15, wherein in the step of determining a switch instruction, a predetermined operation input for calling the setting screen corresponding to the second function is determined as a switch instruction that the setting operation should be switched to the setting operation for the second function.

18. The process control program according to claim 15, further comprising the step of setting an execution order for each of the plural functions in executing the plural functions, wherein in the step of executing the setting, each of the plural functions is executed in the order set by the step of setting an execution order.

19. The process control program according to claim 15, wherein the image processing apparatus is capable of executing predetermined processing using, as a destination, at least one of plural apparatuses connected to the image processing apparatus in a manner that enables communication, and the method comprises the step of displaying a destination list for selecting an apparatus to be the destination of the predetermined processing from the plural apparatuses, as a list of information about installation position of each apparatus.

20. The process control program according to claim 15, wherein in the step of displaying a destination list, a layout display of the information about installation position of each apparatus is shown corresponding to actual installation position of each apparatus.

* * * * *